(12) United States Patent
Imaizumi et al.

(10) Patent No.: US 11,299,012 B2
(45) Date of Patent: Apr. 12, 2022

(54) VEHICLE AIR CONDITIONING APPARATUS

(71) Applicant: HONDA MOTOR CO., LTD., Tokyo (JP)

(72) Inventors: Yuichiro Imaizumi, Wako (JP); Kazuhiko Seki, Wako (JP); Subaru Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 16/662,235

(22) Filed: Oct. 24, 2019

(65) Prior Publication Data
US 2020/0130467 A1    Apr. 30, 2020

(30) Foreign Application Priority Data

Oct. 26, 2018 (JP) .............................. JP2018-201491

(51) Int. Cl.
*B60H 1/00* (2006.01)
*B60N 2/56* (2006.01)
*B60H 1/22* (2006.01)

(52) U.S. Cl.
CPC ..... *B60H 1/00849* (2013.01); *B60H 1/00285* (2013.01); *B60N 2/5628* (2013.01); *B60H 2001/2281* (2013.01)

(58) Field of Classification Search
CPC ............ B60H 1/00849; B60H 1/00285; B60H 2001/2281; B60N 2/5628
See application file for complete search history.

(56) References Cited

U.S. PATENT DOCUMENTS 5,450,894 A  *  9/1995  Inoue ................. B60H 1/00664
                                                                165/43
10,507,704 B2 * 12/2019 Shin .................... B60H 1/00899
10,981,475 B2 *  4/2021 Hotta .................... B60N 2/5635

FOREIGN PATENT DOCUMENTS

JP    2006-035952 A    2/2006
JP    2016-145015 A    8/2016

* cited by examiner

*Primary Examiner* — Steven S Anderson, II
*Assistant Examiner* — Phillip Decker
(74) *Attorney, Agent, or Firm* — Rankin, Hill & Clark LLP

(57) ABSTRACT

A vehicle air conditioning apparatus is provided which includes: a plurality of seat air conditioning units configured to selectively perform cooling or heating per corresponding seat among a plurality of seats installed in a cabin, respectively; and a plurality of exhaust ducts for discharging, outside the cabin, part of air used in the plurality of seat air conditioning units. An exhaust duct of a given one of the plurality of seat air conditioning units is connected to an air inlet of another seat air conditioning unit.

1 Claim, 10 Drawing Sheets

VEHICLE AIR CONDITIONING APPARATUS

TECHNICAL FIELD

The present invention relates to a vehicle air conditioning apparatus.

BACKGROUND ART

Conventionally, as an on-vehicle air conditioning apparatus is provided a system in which cooled or heated air-conditioned air is supplied to the surrounding of a seated occupant (see, for instance, JP2006-35952A and JP2016-145015A). Such a vehicle air conditioning apparatus can cool or heat the surrounding of an occupant in a locally concentrated manner. This makes it possible to provide a comfortable space to the occupant even immediately after initiation of cooling or heating operation, etc.

SUMMARY OF INVENTION

Technical Problem

An in-seat heat exchanger of the vehicle air conditioning apparatus described in JP2006-35952A has a simple structure such that heat is exhausted outside a vehicle while a heat source/cold source, which is assumed to be a Peltier element, is switched. This vehicle air conditioning apparatus described in JP2006-35952A has a problem of poor efficiency and easy-to-occur performance/power deficiency when the Peltier element is used for cooling and/or heating treatment of air supplied.

Meanwhile, the seat air conditioning unit described in JP2016-145015A has a vapor compression heat exchanger installed in a seat. The problem of this seat air conditioning unit described in JP2016-145015A is that heated air during cooling and cooled air during heating cannot be exhausted outside a vehicle. In addition, the seat air conditioning unit described in JP2016-145015A needs a blower fan per exchanger. Unfortunately, this causes the size of the air conditioning unit to be enlarged, which is likely to make the structure complex and increase cost.

The present invention provides a solution to the above problems. The main purpose of the present invention is to provide a highly efficient vehicle air conditioning apparatus such that the internal structure of seat is simplified and heat from a vapor compression heat exchanger can be exhausted outside a vehicle.

Solution to Problem

An aspect of the present invention provides a vehicle air conditioning apparatus which includes: a plurality of seat air conditioning units configured to selectively perform cooling or heating per corresponding seat among a plurality of seats installed in a cabin, respectively; and a plurality of exhaust ducts for discharging, outside the cabin, part of air used in the plurality of seat air conditioning units. An exhaust duct of a given one of the plurality of seat air conditioning units is connected to an air inlet of another seat air conditioning unit.

The present invention makes it possible to simplify ducts and reduce the number of blowing fans and thus simplify an air conditioning apparatus.

DESCRIPTION OF EMBODIMENTS

Figure 1A:
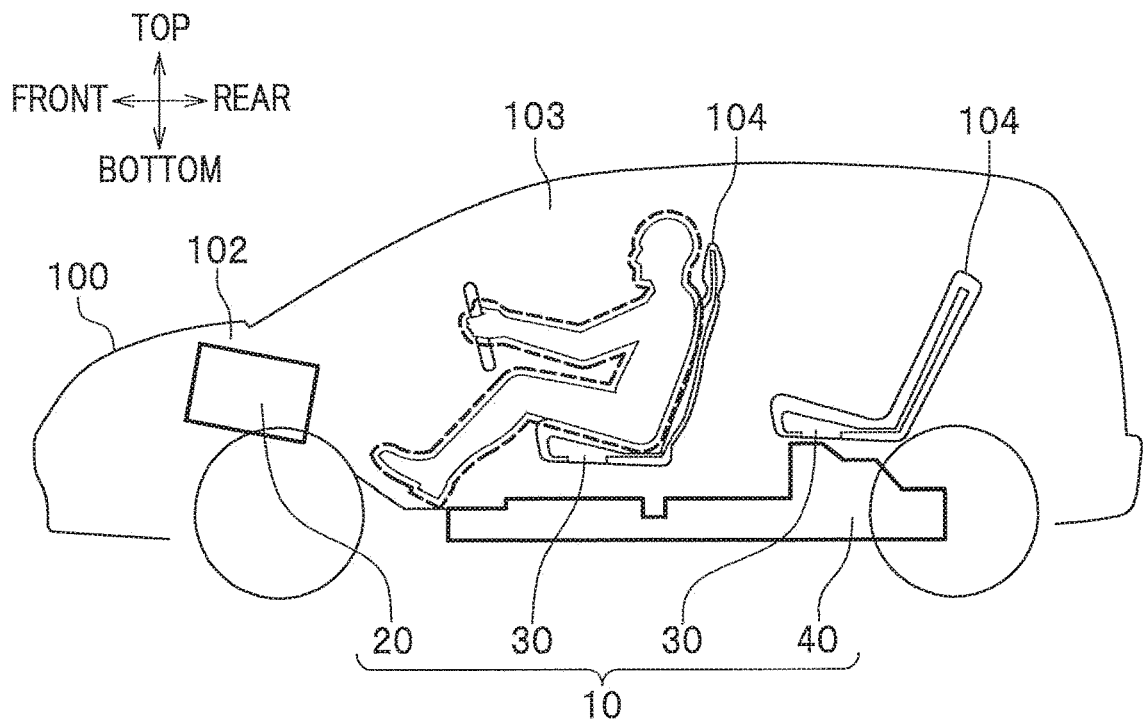
FIG. 1A is a schematic diagram of the structure of a vehicle air conditioning apparatus according to an embodiment when viewed from a lateral side.

Hereinafter, an embodiment of the present invention (hereinafter, referred to as the present embodiment) is described in detail with reference to the Drawings. Note that each figure just schematically depicts the present invention in a sufficiently understandable manner. Thus, the present invention is not limited to each embodiment depicted. Also, in each figure, the same elements or similar elements have the same reference numerals so as to avoid redundancy.

Embodiments

This embodiment provides an air conditioning apparatus 10 in which ducts are simplified and the number of blowing fans is reduced. In addition, this embodiment provides the air conditioning apparatus 10 so as to provide a solution to the problems of a seat air conditioning unit (see FIGS. 10 to 12) of an air conditioning apparatus according to the below-described comparative embodiment.

<Structure of Whole Air Conditioning Apparatus>

Figure 1B:
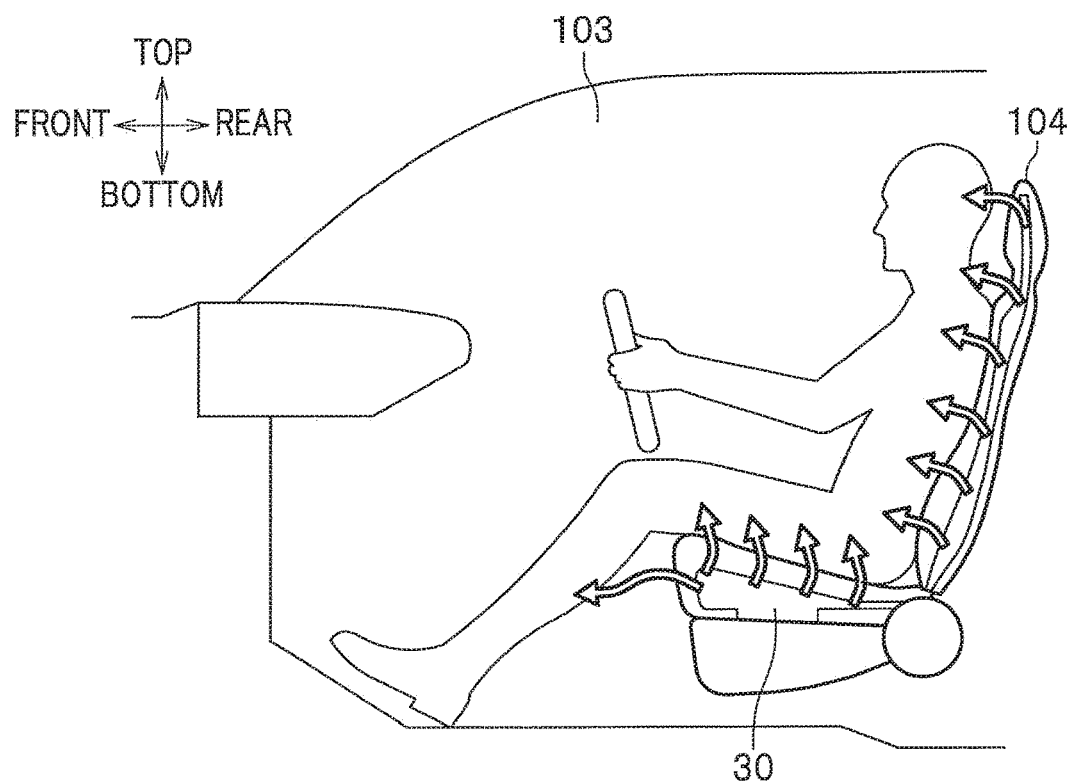
FIG. 1B is a schematic diagram of the structure of a seat air conditioning unit of the vehicle air conditioning apparatus according to the embodiment when viewed from a lateral side.
Figure 2:
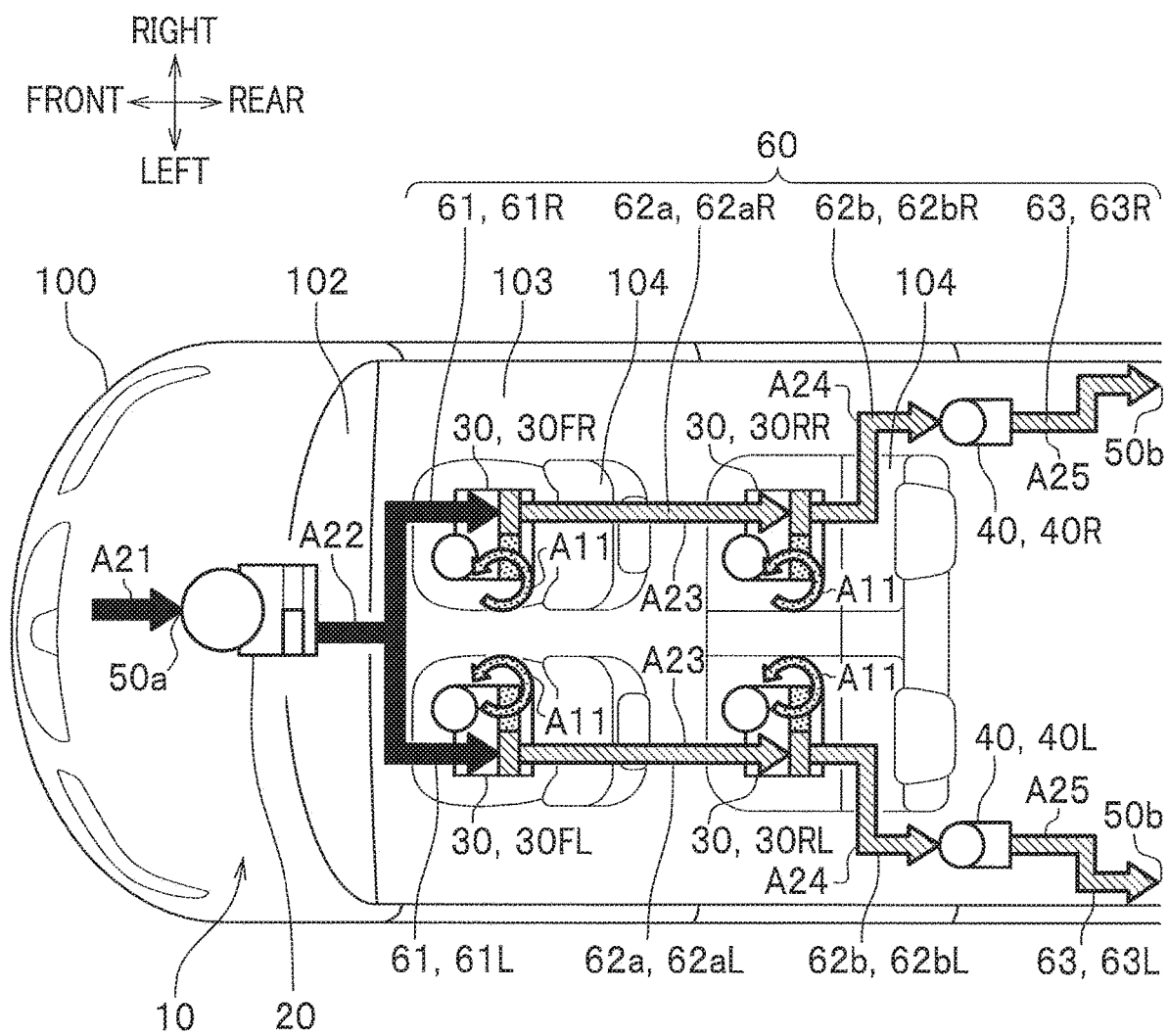
FIG. 2 is a schematic diagram of the structure of the vehicle air conditioning apparatus according to the embodiment when viewed from the above.
Figure 3:
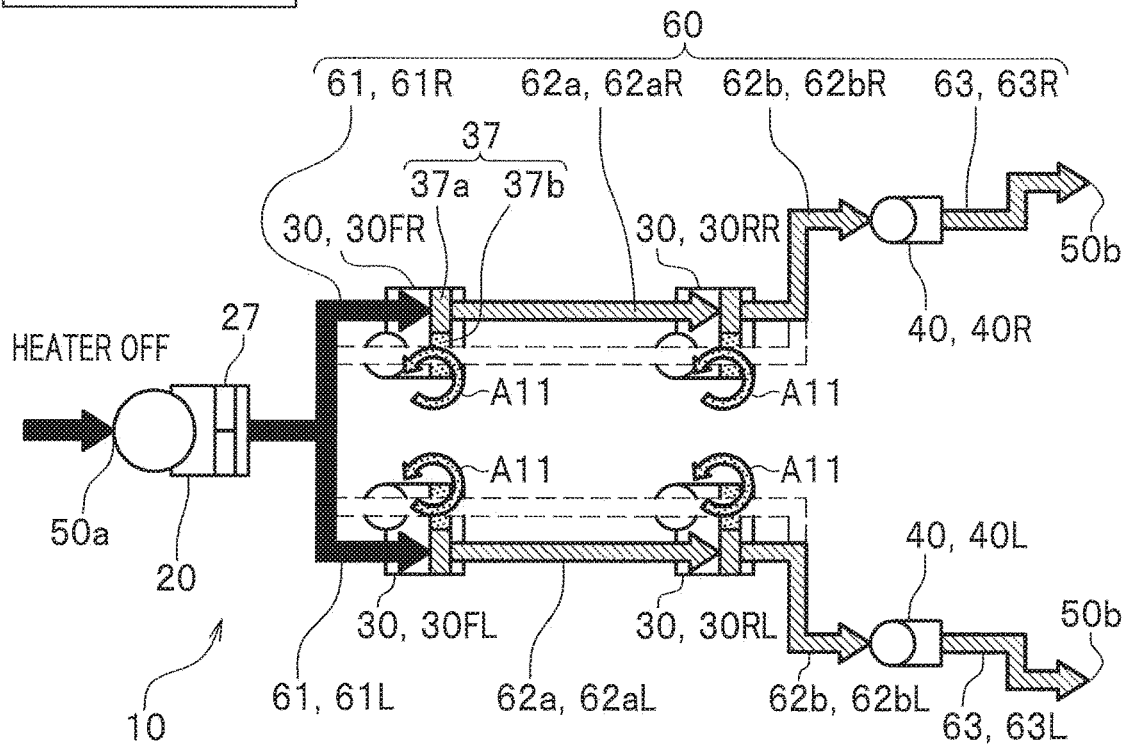
FIG. 3 is a diagram illustrating how the vehicle air conditioning apparatus works during cooling operation.
Figure 4:
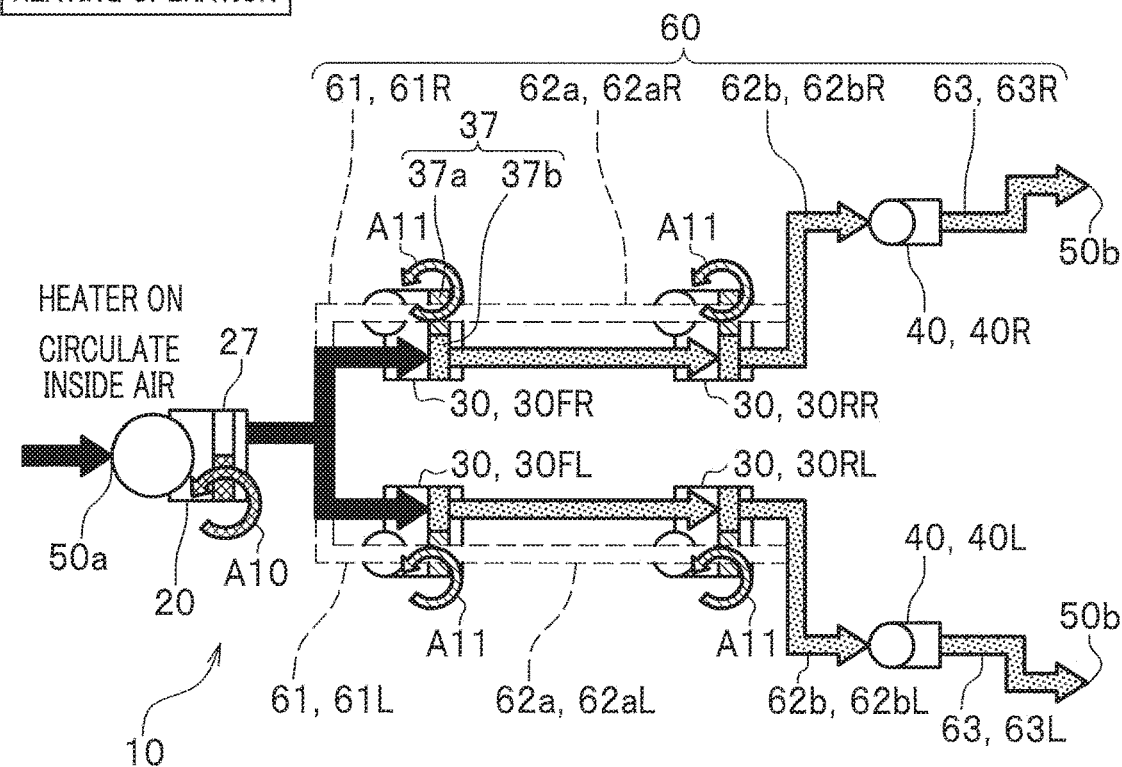
FIG. 4 is a diagram illustrating how the vehicle air conditioning apparatus works during heating operation.

With reference to FIGS. 1A to 4, the following describes the structure of the whole air conditioning apparatus 10 according to this embodiment. The air conditioning apparatus 10 is an on-vehicle air conditioning apparatus. FIG. 1A is a schematic diagram of the structure of the air conditioning apparatus 10 when viewed from a lateral side. FIG. 1B is a schematic diagram of the structure of a seat air conditioning unit 30 of the air conditioning apparatus 10 when viewed from a lateral side. FIG. 2 is a schematic diagram of the structure of the air conditioning apparatus 10 when viewed from the above. FIG. 3 is a diagram illustrating how the air conditioning apparatus 10 works during cooling operation. FIG. 4 is a diagram illustrating how the air conditioning apparatus 10 works during heating operation.

As shown in FIG. 1A, the air conditioning apparatus 10 includes one or more front air conditioning units 20, a plurality of seat air conditioning units 30, and one or more rear blowing units 40. Here, assumed and described is a case where the number of the front air conditioning units 20 is 1, the number of the seat air conditioning units 30 is 4, and the number of the rear blowing units 40 is 2 (see FIG. 2).

The front air conditioning unit 20 is a unit for supplying outside air (air outside a cabin) to each seat air conditioning unit 30. The front air conditioning unit 20 is installed at a front section 102 of a vehicle 100. In this embodiment, the front air conditioning unit 20 functions to heat outside air (air outside a cabin) and inside air (air inside the cabin). Note that the front air conditioning unit 20 may be configured to have a function of cooling outside air and inside air.

Each seat air conditioning unit 30 is a unit for selectively performing cooling or heating per corresponding seat 104. Each seat air conditioning unit 30 is installed at each seat 104 arranged in a cabin 103 (see FIG. 2). The inside of each seat air conditioning unit 30 contains a refrigerant for exchanging heat with the air.

Note that the seat air conditioning unit 30 may be a refrigerating cycle apparatus which includes a compressor, an evaporator, a condenser, and an expansion valve and through which a refrigerant circulates. In this case, during cooling operation, the evaporator generates cold air for cooling and, at the same time, the condenser generates heat. Because of this, this heat generated by the condenser is discharged, as waste heat, outside the vehicle so as to increase cooling efficiency. In addition, during heating operation, the condenser of each seat air conditioning unit 30 generates warm air for heating and, at the same time, the evaporator generates cold heat. Because of this, this cold heat generated by the evaporator is discharged, as waste heat, outside the vehicle so as to increase heating efficiency.

This point applies to cooling/heating operation conducted, without a refrigerant, by using a Peltier element. During cooling operation, simultaneously generated heat is drained outside the vehicle; and during heating operation, simultaneously generated cold heat is drained outside the vehicle.

Each rear blowing unit 40 is a unit for discharging, to the outside through a vent hole 50b (see FIG. 2), heat and part of air (outside air) used in the front air conditioning unit 20 and each seat air conditioning unit 30. Each rear blowing unit 40 is installed at a rear section of the vehicle 100.

As shown in FIG. 1B, each seat air conditioning unit 30 of the air conditioning apparatus 10 is structured such that during cooling/heating operation, cooled or heated air-conditioned air, for example, is supplied to the surrounding of an occupant seated on the seat 104. Such an air conditioning apparatus 10 can supply air-conditioned air to the surrounding of an occupant. This makes it possible to provide a comfortable space to the occupant immediately after initiation of cooling or heating operation, etc.

As shown in FIG. 2, this embodiment provides the air conditioning apparatus 10 including one front air conditioning unit 20, four seat air conditioning units 30, two rear blowing units 40, and ducts 60 through which air flows between the respective units.

FIG. 2 illustrates an example where the vehicle 100 includes one front air conditioning unit 20 at the front section 102. In addition, the vehicle 100 includes the total of four seats 104 on the front right side, the front left side, the rear right side, and the rear left side. Meanwhile, each seat 104 is provided with one seat air conditioning unit 30. In addition, the vehicle 100 includes the total of two rear blowing units 40, each on the rear right side or the rear left side.

The ducts 60 include: air supply ducts 61 connecting the front air conditioning unit 20 and each seat air conditioning unit 30 at a front row; exhaust ducts 62a connecting each seat air conditioning unit 30 at the front row and a corresponding seat air conditioning unit 30 at a rear row and exhaust ducts 62b connecting each seat air conditioning unit 30 at the rear row and a corresponding rear blowing unit 40; and ventilation ducts 63 connecting each rear blowing unit 40 and a corresponding vent hole 50b.

Each air supply duct 61 is a duct for supplying, to a corresponding seat air conditioning unit 30 at the front row, outside air so as to drain heat. The air supply duct 61 may be arranged, for instance, below a vehicle body floor, inside a center tunnel, and/or inside a center console.

The exhaust ducts 62a and 62b and the ventilation ducts 63 are each a duct for discharging, outside the cabin (outside the cabin 103), part of air (outside air) used in each seat air conditioning unit 30. Each ventilation duct 63 is disposed downstream of a corresponding exhaust duct 62b. The exhaust ducts 62a and 62b and the corresponding ventilation duct 63 are used to discharge, outside the cabin, the outside air with warm heat generated by each seat air conditioning unit 30 during cooling operation or cold heat generated by each seat air conditioning unit 30 during heating operation.

Also, in this embodiment, each seat air conditioning unit 30 is provided with: a first route (see the arrows A11) through which inside air circulates; and a second route (see the arrows A21, A22, A23, A24, and A25) through which outside air flows. The first route and the second route are separated to give independent structures.

Each seat air conditioning unit 30 is likewise structured. Hereinafter, when each seat air conditioning unit 30 is distinguished, the unit on the front right side, the front left side, the rear right side, or the rear left side is denoted by adding alphabet characters "FR", "FL", "RR", or "RL", respectively, to the end of reference numeral of each seat air conditioning unit 30. Specifically, each unit is referred to as a "seat air conditioning unit 30FR", "seat air conditioning unit 30FL", "seat air conditioning unit 30RR", or "seat air conditioning unit 30RL".

Furthermore, when the air supply duct 61 on the right side is distinguished from the air supply duct 61 on the left side, the air supply duct 61 on the right side is referred to as an "air supply duct 61R"; and the air supply duct 61 on the left side is referred to as an "air supply duct 61L".

Furthermore, when the exhaust duct 62a on the right side is distinguished from the exhaust duct 62a on the left side, the exhaust duct 62a on the right side is referred to as an "exhaust duct 62aR"; and the exhaust duct 62a on the left side is referred to as an "exhaust duct 62aL". Likewise, when the exhaust duct 62b on the right side is distinguished from the exhaust duct 62b on the left side, the exhaust duct 62b on the right side is referred to as an "exhaust duct 62bR"; and the exhaust duct 62b on the left side is referred to as an "exhaust duct 62bL".

Furthermore, when the ventilation duct 63 on the right side is distinguished from the ventilation duct 63 on the left side, the ventilation duct 63 on the right side is referred to as a "ventilation duct 63R"; and the ventilation duct 63 on the left side is referred to as a "ventilation duct 63L".

The front air conditioning unit 20 is connected via two air supply ducts 61 to two seat air conditioning units 30 at the front row. The two air supply ducts 61 are merged. For instance, FIG. 2 shows an example of a shape where the two air supply ducts 61 are connected to a linear pipe arranged at substantially the middle. In other words, the two air supply ducts 61 are shaped such that a linear pipe arranged at substantially the middle branches into two directions toward the two corresponding seat air conditioning units 30 at the front row. The air outlet side (terminal end side) of each air supply duct 61 is connected to an air inlet for incorporating outside air into the corresponding seat air conditioning unit 30 at the front row.

The seat air conditioning unit 30FR on the front right side is connected via the exhaust duct 62aR to the seat air conditioning unit 30RR on the right side at the rear row. In addition, the seat air conditioning unit 30RR on the rear right side is connected via the exhaust duct 62bR to the rear blowing unit 40R on the right side.

The rear blowing unit 40R on the right side is connected via the ventilation duct 63R to a vent hole 50bR. The vent hole 50bR is open to the outside of the cabin.

The seat air conditioning unit 30FL on the front left side is connected via the exhaust duct 62aL to the seat air conditioning unit 30RL on the left side at the rear row. In addition, the seat air conditioning unit 30RL on the rear left side is connected via the exhaust duct 62bL to the rear blowing unit 40L on the left side.

The rear blowing unit 40L on the left side is connected via the ventilation duct 63L to a vent hole 50bL. The vent hole 50bL is open to the outside of the cabin.

Outside air is taken via an introduction port 50a into the front air conditioning unit 20 and is supplied from the front air conditioning unit 20 via each air supply duct 61 to the corresponding seat air conditioning unit 30 at the front row (see the arrows A21 and A22). The outside air supplied to each seat air conditioning unit 30 at the front row is sent from each seat air conditioning unit 30 at the front row via the corresponding exhaust duct 62a to the corresponding seat air conditioning unit 30 at the rear row (see the arrows A23). Then, the outside air is further sent from each seat air conditioning unit 30 at the rear row via the corresponding exhaust duct 62b to the corresponding rear blowing unit 40 (see the arrows A24). At that time, when the operation state is during cooling operation, the outside air is heated by each seat air conditioning unit 30 (that is, waste warm heat is absorbed). By contrast, when the operation state is during heating operation, the outside air is cooled by each seat air conditioning unit 30 (that is, waste cold heat is absorbed). Then, the outside air sent to each rear blowing unit 40 is sent from the rear blowing unit 40 via the corresponding ventilation duct 63 to the corresponding vent hole 50b so as to be discharged from the vent hole 50b to the outside of the cabin (see the arrows A25). At that time, the outside air is pressurized by each rear blowing unit 40 and is then delivered to the downstream side.

In contrast to such outside air, inside air is incorporated from the inside of the cabin into each seat air conditioning unit 30. After heat is exchanged, as needed, depending on the operation state, the inside air is discharged to the inside of the cabin (see the arrows A11).

<How Air Conditioning Apparatus Works During Cooling Operation>

With reference to FIG. 3, the following illustrates how the air conditioning apparatus 10 works during cooling operation. FIG. 3 is a diagram illustrating how the air conditioning apparatus 10 works during cooling operation. Note that, the front air conditioning unit 20 has a built-in heater 27 configured to selectively heat inside air or outside air. In addition, each seat air conditioning unit 30 has a heat exchanger 37 including a condenser 37a and an evaporator 37b.

As shown in FIG. 3, during cooling operation, the heater 27 of the front air conditioning unit 20 is in an OFF state. In addition, the front air conditioning unit 20 is in a state in which inside air circulation is stopped (that is, in a state in which incorporation of inside air from the cabin and discharge of the inside air into the cabin are stopped). Also, in the heat exchanger 37 of each seat air conditioning unit 30, the condenser 37a and the evaporator 37b are in an ON state.

The front air conditioning unit 20 incorporates outside air from the introduction port 50a thereinto and supplies the outside air via each air supply duct 61 to the corresponding seat air conditioning unit 30 at the front row. Each seat air conditioning unit 30 at the front row takes in inside air from the cabin (see the arrows A11) and heat is then exchanged by the heat exchanger 37 between a refrigerant and the inside air and between a refrigerant and the outside air. At that time, in each seat air conditioning unit 30 at the front row, the outside air is heated by the condenser 37a (that is, waste warm heat is given to the outside air) and the inside air is cooled by the evaporator 37b.

Each seat air conditioning unit 30 at the front row sends the outside air heated by the condenser 37a, via the corresponding exhaust duct 62a, to the corresponding seat air conditioning unit 30 at the rear row. Each seat air conditioning unit 30 at the rear row can work like each seat air conditioning unit 30 at the front row. After that, each seat air conditioning unit 30 at the rear row sends the outside air, via the corresponding exhaust duct 62b, to the corresponding rear blowing unit 40. The rear blowing unit 40 sends the outside air via the corresponding ventilation duct 63 to the corresponding vent hole 50b and the outside air is then discharged from the vent hole 50b to the outside of the cabin. In this way, the air conditioning apparatus 10 can discharge the outside air with heat to the outside of the cabin. That is, the air conditioning apparatus 10 discards, as waste heat, warm heat generated by the condenser 37a of each seat air conditioning unit 30. In addition, the air conditioning apparatus 10 can release, into the cabin, the inside air cooled by the evaporator 37b. This enables cooling of the cabin 103 to be conducted by the air conditioning apparatus 10.

<How Air Conditioning Apparatus Works During Heating Operation>

With reference to FIG. 4, the following illustrates how the air conditioning apparatus 10 works during heating operation. FIG. 4 is a diagram illustrating how the air conditioning apparatus 10 works during heating operation.

As shown in FIG. 4, during heating operation, the heater 27 of the front air conditioning unit 20 is in an ON state. In addition, the front air conditioning unit 20 is in a state in which inside air circulation is implemented (that is, in a state in which incorporation of inside air from the cabin and discharge of the inside air into the cabin are implemented). Also, in the heat exchanger 37 of each seat air conditioning unit 30, the condenser 37a and the evaporator 37b are in an ON state. Note that when each seat air conditioning unit 30 can generate adequately warm heat, the heater 27 of the front air conditioning unit 20 may be turned OFF.

In the front air conditioning unit 20, inside air is taken in from the cabin, the inside air is heated by the heater 27, and the heated inside air is then released into the cabin (see the arrow A10). In addition, the front air conditioning unit 20 incorporates outside air from the introduction port 50a thereinto and supplies the outside air via each air supply duct 61 to the corresponding seat air conditioning unit 30 at the front row. Each seat air conditioning unit 30 at the front row takes in inside air from the cabin (see the arrows A11) and heat is then exchanged by the heat exchanger 37 between a refrigerant and the inside air and between a refrigerant and the outside air. At that time, in each seat air conditioning unit 30 at the front row, the outside air is cooled by the evaporator 37b (that is, waste cold heat is given to the outside air) and the inside air is heated by the condenser 37a.

Each seat air conditioning unit 30 at the front row sends the outside air cooled by the evaporator 37b, via the corresponding exhaust duct 62a, to the corresponding seat air conditioning unit 30 at the rear row. Each seat air conditioning unit 30 at the rear row can work like each seat air conditioning unit 30 at the front row. After that, each seat air conditioning unit 30 at the rear row sends the outside air, via the corresponding exhaust duct 62b, to the corresponding rear blowing unit 40. The rear blowing unit 40 sends the outside air via the corresponding ventilation duct 63 to the corresponding vent hole 50b and the outside air is then discharged from the vent hole 50b to the outside of the cabin. In this way, the air conditioning apparatus 10 can discharge the resulting outside air to the outside of the cabin. That is, the air conditioning apparatus 10 discards, as waste heat, cold heat generated by the evaporator 37b of each seat air conditioning unit 30. In addition, the air conditioning apparatus 10 can release, into the cabin, the inside air heated by the heat exchanger 37. This enables heating of the cabin 103 to be conducted by the air conditioning apparatus 10.

<Configuration of Front Air Conditioning Unit>

Figure 5A:
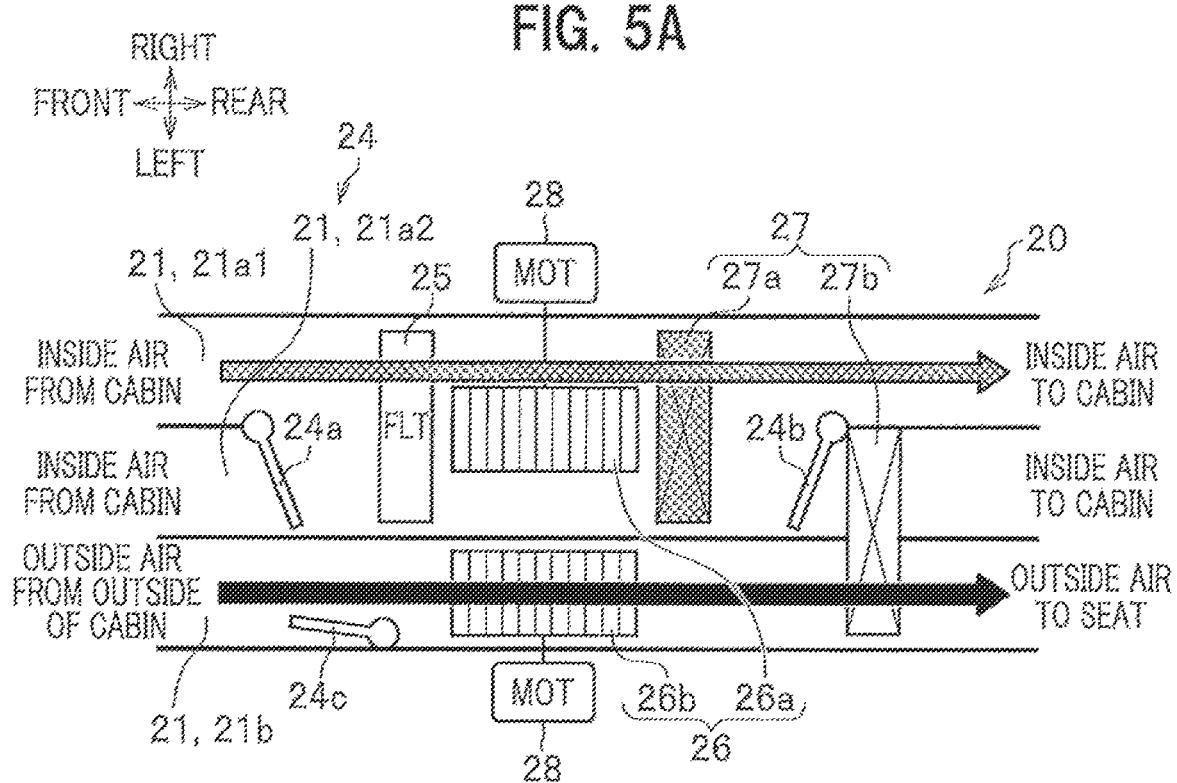
FIG. 5A is a schematic diagram of the structure of a front air conditioning unit when viewed from the above.

With reference to FIG. 5A, the following describes the structure of the front air conditioning unit 20. FIG. 5A is a schematic diagram of the structure of the front air conditioning unit 20 when viewed from the above.

As shown in FIG. 5A, the front air conditioning unit 20 includes: an inside/outside air switching damper 21 for switching an inside air flow and an outside air flow; a filter 25 for removing fine dust contained in the inside air; fans 26 for causing the inside air and/or the outside air to flow; and a heater 27 for selectively heating the inside air and/or the outside air. The inside/outside air switching damper 21 is provided with: two inside air-flowing passages (the first inside air passage 21a1 and the second inside air passage 21a2); and one outside air-flowing passage (outside air passage 21b). The front air conditioning unit 20 has two fans 26 including a fan 26a driven by a motor 28 for inside air and a fan 26b driven by a motor 28 for outside air. The heater 27 includes: a heater core 27a configured to heat air for air conditioning; and a heat pipe 27b in which a refrigerant is evaporated or condensed to transfer heat from a high-temperature part to a low-temperature part.

The first inside air passage 21a1, the second inside air passage 21a2, and the outside air passage 21b are arranged extending in a front-rear direction. The first inside air passage 21a1 and the second inside air passage 21a2 each have an air inlet and an air outlet installed at the cabin. In addition, the outside air passage 21b has an air inlet installed outside the cabin and its air outlet side is connected to each air supply duct 61.

The first inside air passage 21a1 and the second inside air passage 21a2 are adjacent to each other and share a common space in their partway. The common space is provided with the filter 25, the fan 26a, and the heater core 27a. The fan 26a is positioned downstream of the filter 25. The heater core 27a is positioned downstream of the fan 26a.

The second inside air passage 21a2 and the outside air passage 21b are adjacent to each other. The fan 26b is arranged in the inside of the outside air passage 21b. In this embodiment, the fan 26a and the fan 26b are arranged at substantially the same vehicle-longitudinal position. In addition, the heat pipe 27b is arranged in the inside of the outside air passage 21b and the second inside air passage 21a2. The heat pipe 27b is positioned downstream of the heater core 27a.

Switching doors 24a and 24b are provided between the first inside air passage 21a1 and the second inside air passage 21a2. The switching door 24a is positioned upstream of the filter 25. In addition, the switching door 24b is positioned downstream of the heater core 27a and upstream of the heat pipe 27b. Also, the inside of the outside air passage 21b has a switching door 24c. The switching door 24c is positioned upstream of the fan 26b. The switching doors 24a, 24b, and 24c control switching in or between passages. The switching door 24a, the first inside air passage 21a1, the second inside air passage 21a2, the outside air passage 21b, and the switching door 24c provide a passage switching device 24.

The front air conditioning unit 20 causes inside air taken in from the cabin to be pressurized by the fan 26a and then to flow, via either the first inside air passage 21a1 or the second inside air passage 21a2 or both, to the downstream side. At that time, the front air conditioning unit 20, depending on the operation state, causes the inside air to be heated by the heater core 27a and/or uses the heat pipe 27b to exchange heat between the inside air and the outside air. After that, the front air conditioning unit 20 releases the inside air into the cabin.

In addition, the front air conditioning unit 20 causes outside air taken in from the outside to be pressurized by the fan 26b and then to flow, via the outside air passage 21b, to the downstream side. At that time, the front air conditioning unit 20, depending on the operation state, uses the heat pipe 27b to exchange heat between the inside air and the outside air. After that, the front air conditioning unit 20 supplies the outside air via each air supply duct 61 to the corresponding seat air conditioning unit 30 at the front row.

<Configuration of Seat Air Conditioning Unit>

Figure 5B:
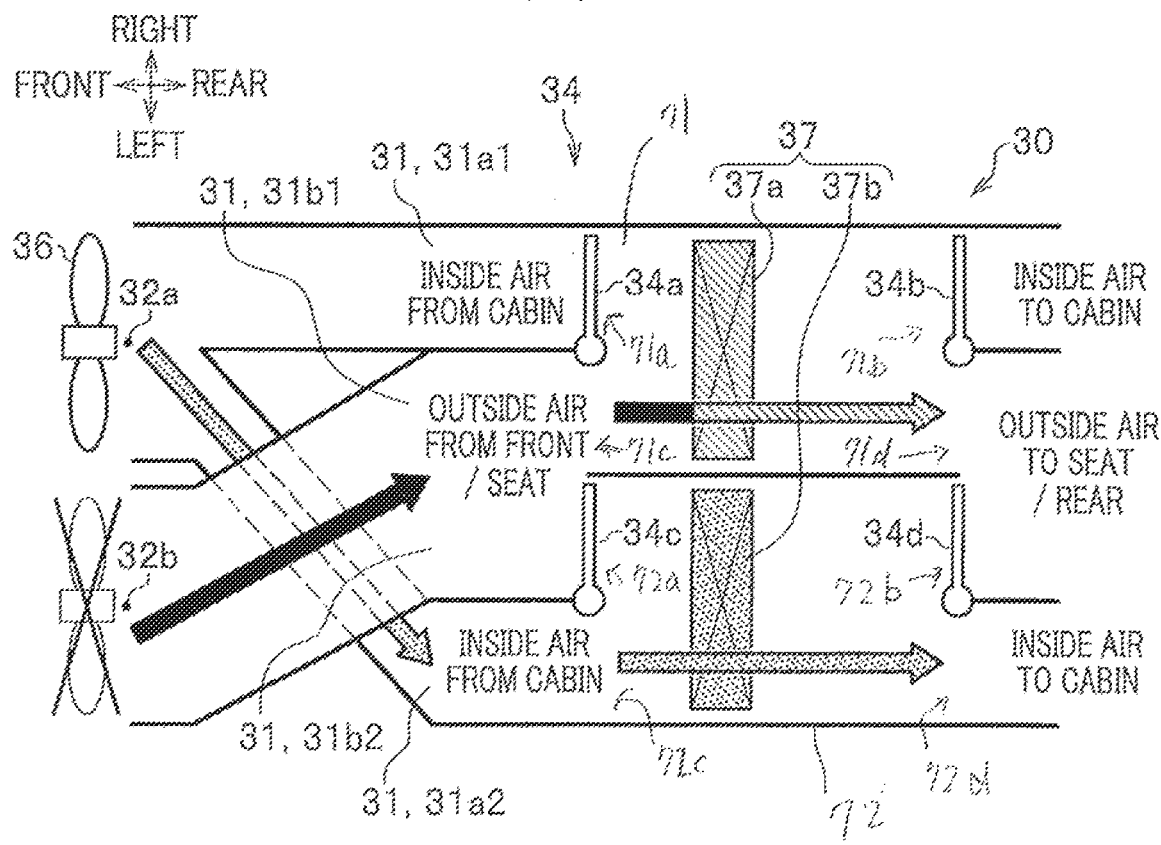
FIG. 5B is a schematic diagram of the structure of the seat air conditioning unit when viewed from the above.

With reference to FIG. 5B, the following describes the structure of each seat air conditioning unit 30. FIG. 5B is a schematic diagram of the structure of the seat air conditioning unit 30 when viewed from the above. The seat air conditioning units 30 at the front and rear rows are likewise structured. Here, assumed and described is a case where the seat air conditioning units 30 are disposed at the front row.

As shown in FIG. 5B, each seat air conditioning unit 30 includes: an inside/outside air switching damper 31 for switching an inside air flow and an outside air flow; a fan 36 for causing the inside air to flow; and a heat exchanger 37 for exchange heat between a refrigerant and the inside air and between a refrigerant and the outside air. The inside/outside air switching damper 31 is provided with: two inside air-flowing passages (the first inside air passage 31a1 and the second inside air passage 31a2); and two outside air-flowing passages (the first outside air passage 31*b*1 and the second outside air passage 31*b*2). In addition, the seat air conditioning unit 30 has the heat exchanger 37 including a condenser 37*a*, in which a refrigerant is condensed, and an evaporator 37*b*, in which a refrigerant is evaporated. Here, the condenser 37*a* and the evaporator 37*b* of the seat air conditioning unit 30, together with a compressor (not shown) and an expansion valve (not shown), are described to constitute a refrigerating cycle apparatus through which a refrigerant circulates.

The first inside air passage 31*a*1, the second inside air passage 31*a*2, the first outside air passage 31*b*1, and the second outside air passage 31*b*2 are arranged extending in a front-rear direction. The first inside air passage 31*a*1 and the second inside air passage 31*a*2 share an air inlet 32*a* and each has an air outlet installed at the cabin. In addition, the first outside air passage 31*b*1 and the second outside air passage 31*b*2 shares an air inlet 32*b* installed outside the cabin and their air outlet side is connected to the exhaust duct 62*a*. In this regard, however, when each seat air conditioning units 30 is at the rear row, the air outlet side of the first outside air passage 31*b*1 and the second outside air passage 31*b*2 is connected to the corresponding exhaust duct 62*b*.

The first inside air passage 31*a*1 and the second inside air passage 31*a*2 are formed such that the air inlet 32*a* branches into two passages. The first inside air passage 31*a*1 is disposed next to the right outer side of the first outside air passage 31*b*1. The second inside air passage 31*a*2 is disposed next to the left outer side of the second outside air passage 31*b*2. The first outside air passage 31*b*1 and the second outside air passage 31*b*2 are adjacent to each other so as to pass through, from the air inlet 32*b*, substantially the vehicle widthwise center of the seat air conditioning unit 30.

The first inside air passage 31*a*1 and the first outside air passage 31*b*1 share a common space, i.e., a condenser air passage 71, in their partway. The common space is provided with the condenser 37*a*. The second inside air passage 31*a*2 and the second outside air passage 31*b*2 share a common space, i.e., an evaporator air passage 72, in their partway. The common space is provided with the evaporator 37*b*. In this embodiment, the condenser 37*a* and the evaporator 37*b* are arranged at substantially the same vehicle-longitudinal position.

Switching doors 34*a* and 34*b* are provided between the first inside air passage 31*a*1 and the first outside air passage 31*b*1. The switching door 34*a* is positioned upstream of the condenser 37*a* and disposed to close any one of the outside air inlet 71*a* or the inside air outlet 71*c* of the condenser air passage 71, and open the other. In addition, the switching door 34*b* is positioned downstream of the condenser 37*a* and disposed to close any one of the inside air outlet 71*b* or the outside air outlet 71*d* of the condenser air passage 71 and open the other.

Switching doors 34*c* and 34*d* are provided between the second inside air passage 31*a*2 and the second outside air passage 31*b*2. The switching door 34*c* is positioned upstream of the evaporator 37*b* and disposed to close any one of the outside air inlet 72*a* or the inside air inlet 72*c* of the evaporator air passage 72, and open the other. In addition, the switching door 34*d* is positioned downstream of the evaporator 37*b* and disposed to close any one of the outside air outlet 72*b* or the inside air outlet 72*d* of the evaporator air passage, and open the other. The switching doors 34*a*, 34*b*, 34*c*, and 34*d* are provided for switching between passages. The switching doors 34*a* and 34*c*, the first inside air passage 31*a*1, the first outside air passage 31*b*1, the second outside air passage 31*b*2, and the second inside air passage 31*a*2 provide a switching device 34 configured to perform switching between the passages such that during cooling operation, the outside air is guided in a direction toward the condenser 37*a* and during heating operation, the outside air is guided to a direction toward the evaporator 37*b*. Accordingly, the passage switching device 34 can perform switching between the passage such that during cooling operation, the outside air is guided in a direction toward the condenser 37*a* and during heating operation, the outside air is guided to a direction toward the evaporator 37*b*.

The seat air conditioning unit 30 causes inside air taken in from the cabin to be pressurized by the fan 36 and then to flow, via either the first inside air passage 31*a*1 or the second inside air passage 31*a*2, to the downstream side. At that time, in the seat air conditioning unit 30, heat is exchanged by the heat exchanger 37 between a refrigerant and the inside air and between a refrigerant and the outside air. After that, the seat air conditioning unit 30 releases the inside air into the cabin.

Further, the seat air conditioning unit 30 causes outside air taken in from the outside to flow, via either the first outside air passage 31*b*1 or the second outside air passage 31*b*2, to the downstream side. At that time, in the seat air conditioning unit 30, heat is exchanged by the heat exchanger 37 between a refrigerant and the inside air and between a refrigerant and the outside air. After that, the seat air conditioning unit 30 sends the outside air, via the corresponding exhaust duct 62*a*, to the corresponding seat air conditioning unit 30 at the rear row. In this regard, however, when each seat air conditioning unit 30 is at the rear row, the seat air conditioning unit sends the outside air, via the corresponding exhaust duct 62*b*, to the corresponding rear blowing unit 40.

Note that in order to circulate inside air between each seat air conditioning unit 30 and the cabin, the seat air conditioning unit 30 has the fan 36 on the inside air inlet 32*a* side. However, each seat air conditioning unit 30 is provided with no fan (blowing fan) on the outside air inlet 32*b* side.

This is because the air conditioning apparatus 10 has the following configuration which makes it possible to omit a fan (blowing fan) on the outside air inlet 32*b* side.

(a) The air conditioning apparatus 10 is structured such that outside air is pressurized by the fan 26*b* (see FIG. 5A) of the front air conditioning unit 20 and is then delivered from the front air conditioning unit 20 to each seat air conditioning unit 30.

(b) The air conditioning apparatus 10 is structured such that a fan 46 (see FIG. 5C) of each rear blowing unit 40 sucks outside air from each seat air conditioning unit 30 to the rear blowing unit 40.

Such an air conditioning apparatus 10 makes it possible to reduce the number of parts by the number of fans (blowing fans) omitted on the outside air inlet 32*b* side. For instance, when the air conditioning apparatus 10 has four seat air conditioning units 30, four outside air-use fans (blowing fans) can be omitted. In addition, in the air conditioning apparatus 10, the size of each seat air conditioning unit 30 can be made compact.

<Configuration of Rear Blowing Unit>

Figure 5C:
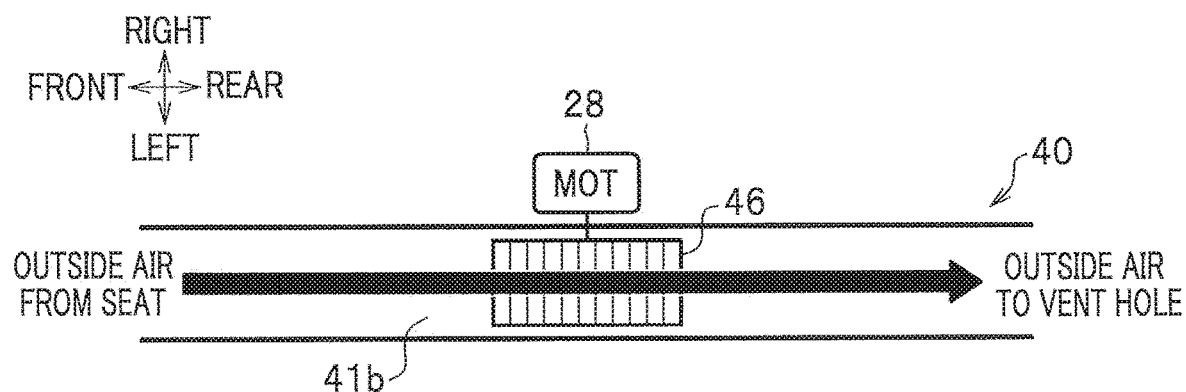
FIG. 5C is a schematic diagram of the structure of a rear blowing unit when viewed from the above.

With reference to FIG. 5C, the following describes the structure of each rear blowing unit 40. FIG. 5C is a schematic diagram of the structure of the rear blowing unit 40 when viewed from the above.

As shown in FIG. 5C, each rear blowing unit 40 includes an outside air passage 41*b* through which outside air flows and the fan 46 configured to cause the outside air to flow. Of the outside air passage 41b, the air inlet side (starting end side) is connected to the exhaust duct 62b; and the air outlet side (terminal end side) is connected to the ventilation duct 63. The fan 46 is arranged in the inside of the outside air passage 41b.

<How Front Air Conditioning Unit Works During Cooling Operation>

Figure 6:
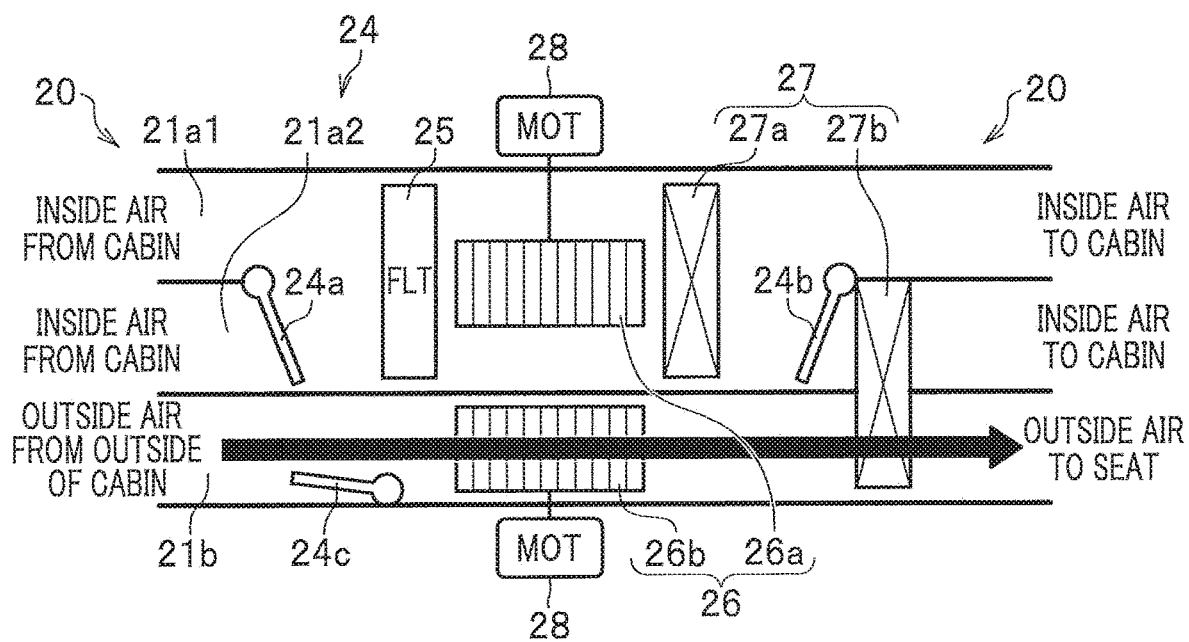
FIG. 6 is a diagram illustrating how the front air conditioning unit works during cooling operation.

With reference to FIG. 6, the following illustrates how the front air conditioning unit 20 works during cooling operation. FIG. 6 is a diagram illustrating how the front air conditioning unit 20 works during cooling operation.

As shown in FIG. 6, in the front air conditioning unit 20 during cooling operation, the switching doors 24a and 24b are operated to open the first inside air passage 21a1 and close the second inside air passage 21a2. In addition, the switching door 24c is in a state in which the outside air passage 21b is open. Further, the heater core 27a and the heat pipe 27b are turned OFF.

While kept under such conditions, the front air conditioning unit 20 does not actuate the fan 26a, resulting in a state in which inside air circulation is stopped. Meanwhile, the front air conditioning unit 20 actuates the fan 26b to cause outside air to flow through the first outside air passage 21b to the downstream side and to pass through the heat pipe 27b. At that time, heat is not exchanged between the outside air and the inside air.

<How Front Air Conditioning Unit Works During Heating Operation>

Figure 7A:
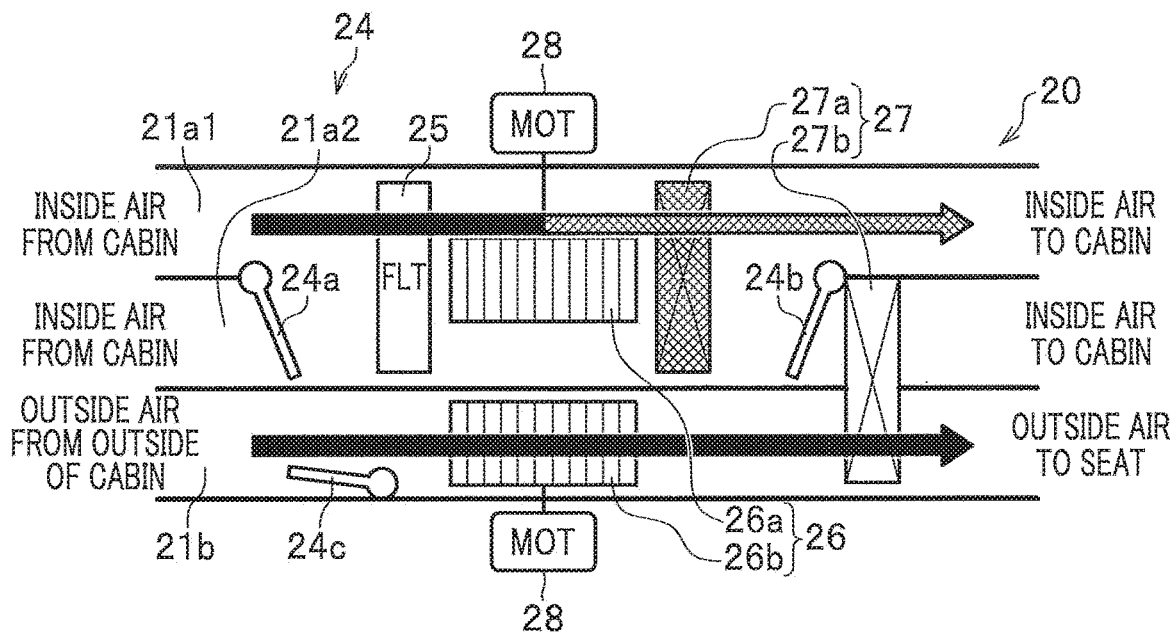
FIG. 7A is a diagram illustrating how the front air conditioning unit works when the temperature of a cabin front section is raised during heating operation.
Figure 7B:
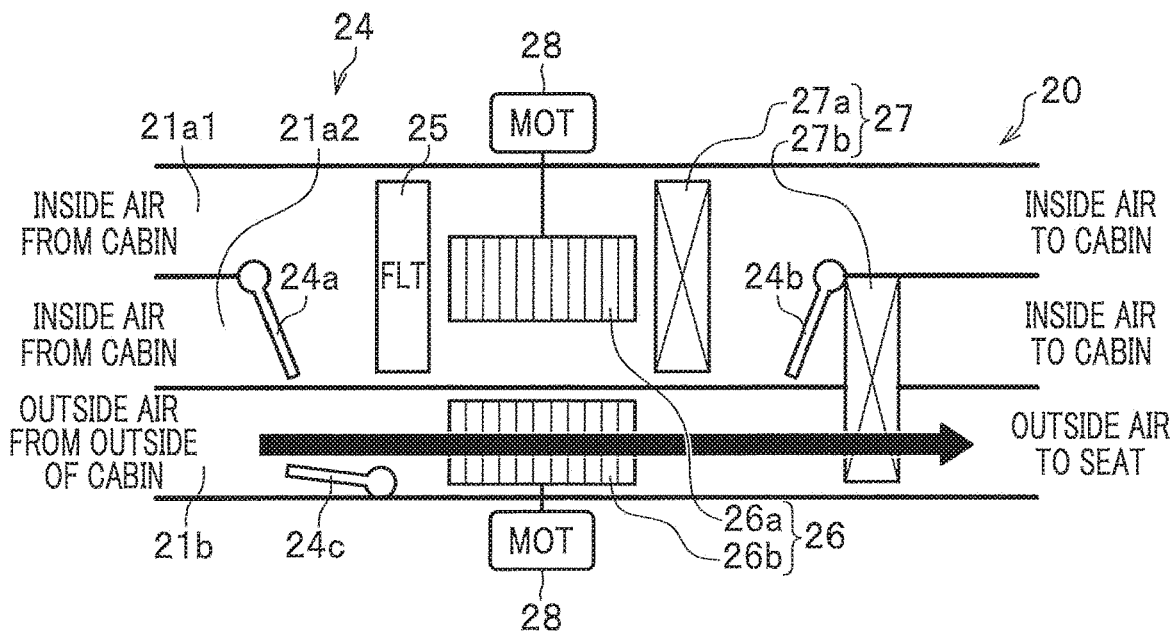
FIG. 7B is a diagram illustrating how the front air conditioning unit works when the outside air temperature is high (at about 0° C.) during heating operation.
Figure 7C:
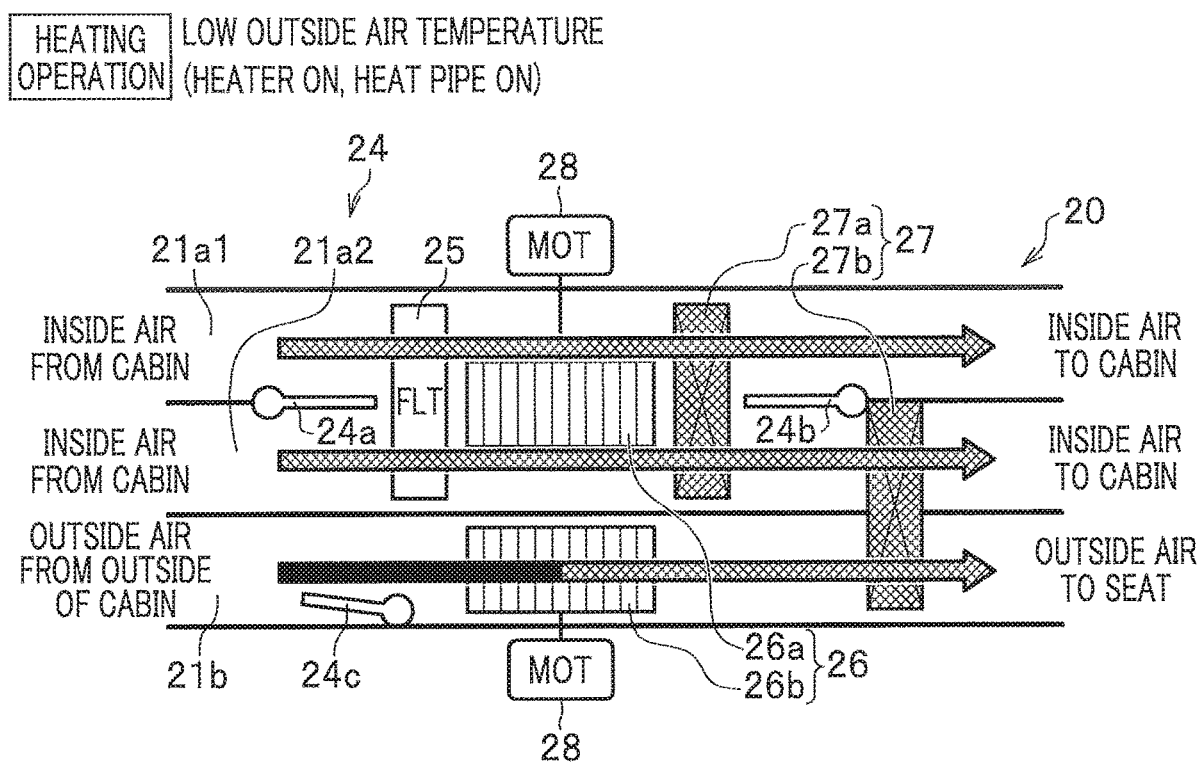
FIG. 7C is a diagram illustrating how the front air conditioning unit works when the outside air temperature is low during heating operation (when each seat air conditioning unit is deficient in performance).

With reference to FIGS. 7A to 7C, the following illustrates how the front air conditioning unit 20 works when the temperature of a cabin front section is raised during heating operation. FIG. 7A is a diagram illustrating how the front air conditioning unit 20 works when the temperature of a cabin front section is raised during heating operation. FIG. 7B is a diagram illustrating how the front air conditioning unit 20 works when the outside air temperature is high (at about 0° C.) during heating operation. FIG. 7C is a diagram illustrating how the front air conditioning unit 20 works when the outside air temperature is low during heating operation (when each seat air conditioning unit 30 is deficient in performance).

(How Front Air Conditioning Unit Works when Temperature of Cabin Front Section is Raised)

When the temperature of the cabin front section is raised, the front air conditioning unit 20 actuates the heater core 27a to elevate the cabin temperature around the front air conditioning unit 20. When the temperature of the cabin front section is raised in such a manner, as shown in FIG. 7A, the switching doors 24a and 24b in the front air conditioning unit 20 are operated to open the first inside air passage 21a1 and close the second inside air passage 21a2. In addition, the switching door 24c is in a state in which the outside air passage 21b is open. Further, the heater core 27a is turned ON and the heat pipe 27b is turned OFF.

While kept under such conditions, the front air conditioning unit 20 actuates the fan 26a to cause inside air to flow through the first inside air passage 21a1 to the downstream side. At that time, fine dust is removed by the filter 25. Further, the inside air is then made to pass through the heater core 27a for heating. Meanwhile, the front air conditioning unit 20 actuates the fan 26b to cause outside air to flow through the first outside air passage 21b to the downstream side and to pass through the heat pipe 27b. At that time, heat is not exchanged between the outside air and the inside air. After that, the front air conditioning unit 20 delivers the outside air via each air supply duct 61 to the evaporator 37b of the corresponding seat air conditioning unit 30 at the front row.

(How Front Air Conditioning Unit Works when Outside Air Temperature is High)

When the outside air temperature is high (at about 0° C.), the front air conditioning unit 20 only blows air to each seat air conditioning unit 30. When the outside air temperature is this high, as shown in FIG. 7B, the switching doors 24a and 24b in the front air conditioning unit 20 are operated to open the first inside air passage 21a1 and close the second inside air passage 21a2. In addition, the switching door 24c is in a state in which the outside air passage 21b is open. Further, the heater core 27a and the heat pipe 27b are turned OFF.

While kept under such conditions, the front air conditioning unit 20 does not actuate the fan 26a, resulting in a state in which inside air circulation is stopped. Meanwhile, the front air conditioning unit 20 actuates the fan 26b to cause outside air to flow through the first outside air passage 21b to the downstream side and to pass through the heat pipe 27b. At that time, heat is not exchanged between the outside air and the inside air. After that, the front air conditioning unit 20 delivers the outside air via each air supply duct 61 to the evaporator 37b of the corresponding seat air conditioning unit 30 at the front row.

(How Front Air Conditioning Unit Works when Outside Air Temperature is Low)

When the outside air temperature is low, the front air conditioning unit 20 actuates the heater core 27a and the heat pipe 27b to elevate the cabin temperature and the blowing temperature of the inside air as well as to increase the blowing temperature of the outside air delivered to each seat air conditioning unit 30. When the outside air temperature is this low, as shown in FIG. 7C, the switching doors 24a and 24b in the front air conditioning unit 20 are operated to open the first inside air passage 21a1 and the second inside air passage 21a2. In addition, the switching door 24c is in a state in which the outside air passage 21b is open. Further, the heater core 27a and the heat pipe 27b are turned ON. Note that when each seat air conditioning unit 30 can generate adequate warm heat, the heater 27 of the front air conditioning unit 20 may be turned OFF.

While kept under such conditions, the front air conditioning unit 20 actuates the fan 26a to cause inside air to flow through the first inside air passage 21a1 and the second inside air passage 21a2. At that time, fine dust is removed by the filter 25. Further, the inside air is then made to pass through the heater core 27a for heating. Meanwhile, the front air conditioning unit 20 actuates the fan 26b to cause outside air to flow through the first outside air passage 21b to the downstream side and to pass through the heat pipe 27b. At that time, heat is exchanged between the outside air and the inside air by means of the heat pipe 27b. After that, the front air conditioning unit 20 delivers the outside air via each air supply duct 61 to the condenser 37a of the corresponding seat air conditioning unit 30 at the front row.

Note that the operation illustrated in FIG. 7C is described below. When the outside air temperature is low, the heating capacity of each seat air conditioning unit 30 is likely to be insufficient. In this case, the operation aims at making it possible for each seat air conditioning unit 30 to immediately blow warm air to an occupant.

Specifically, for instance, when the outside air temperature is low, namely when the heating capacity of each seat air conditioning unit 30 is likely to be insufficient, electric vehicles without any engine cannot utilize, for heating, heat generated by the engine. In addition, in view of their performance characteristics, refrigerating cycle apparatuses need more time to generate warm air than to generate cold air. Because of this, when the outside air temperature is low, the seat air conditioning unit 30 requires considerable time to generate sufficiently warm air. Thus, when the outside air temperature is low, as shown in FIG. 7C, the heater 27 of the front air conditioning unit 20 in the air conditioning apparatus 10 is turned ON. This compensates the insufficient heating capacity of each seat air conditioning unit 30 and makes it possible for the seat air conditioning unit 30 to immediately blow warm air to an occupant.

<How Seat Air Conditioning Unit Works During Cooling Operation>

Figure 8:
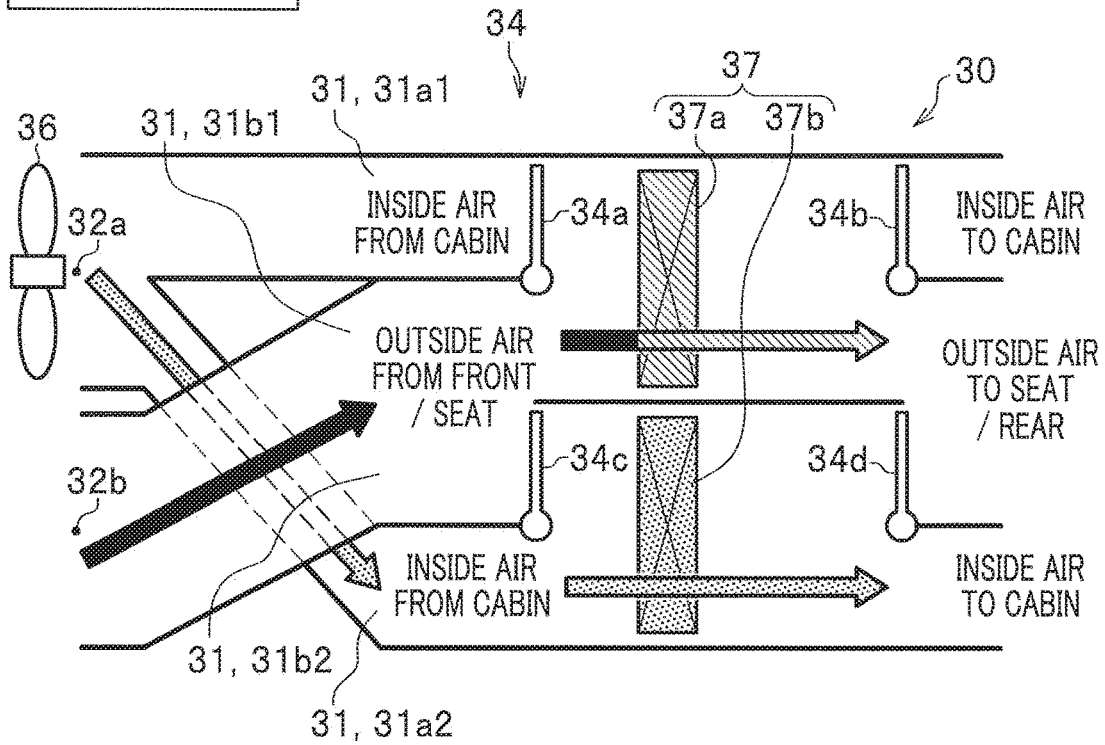
FIG. 8 is a diagram illustrating how the seat air conditioning unit works during cooling operation.

With reference to FIG. 8, the following illustrates how each seat air conditioning unit 30 works during cooling operation. FIG. 8 is a diagram illustrating how the seat air conditioning unit 30 works during cooling operation. Here, assumed and described is a case where the seat air conditioning units 30 are disposed at the front row.

As shown in FIG. 8, in each seat air conditioning unit 30 during cooling operation, the switching doors 34a and 34b are operated to close the first inside air passage 31a1 and open the first outside air passage 31b1. In addition, the switching doors 34c and 34d are operated to close the second outside air passage 31b2 and open the second inside air passage 31a2. Further, the condenser 37a and the evaporator 37b are turned ON.

While kept under such conditions, the seat air conditioning unit 30 actuates the fan 36 to cause inside air to flow through the second inside air passage 31a2 to the downstream side and then to pass through the evaporator 37b. At that time, heat is exchanged between the inside air and a refrigerant flowing through the evaporator 37b. This cools the inside air. After that, the seat air conditioning unit 30 releases the inside air into the cabin. In addition, each seat air conditioning unit 30 causes outside air delivered from the front air conditioning unit 20 to flow through the first outside air passage 31b1 and then to pass through the condenser 37a. At that time, heat is exchanged between the outside air and a refrigerant flowing through the condenser 37a. This heats the outside air. After that, the seat air conditioning unit 30 sends the outside air, via the corresponding exhaust duct 62a, to the corresponding seat air conditioning unit 30 at the rear row. Each seat air conditioning unit 30 at the rear row can work like each seat air conditioning unit 30 at the front row. After that, each seat air conditioning unit 30 at the rear row sends the outside air, via the corresponding exhaust duct 62b, to the corresponding rear blowing unit 40.

<How Seat Air Conditioning Unit Works During Heating Operation>

Figure 9:
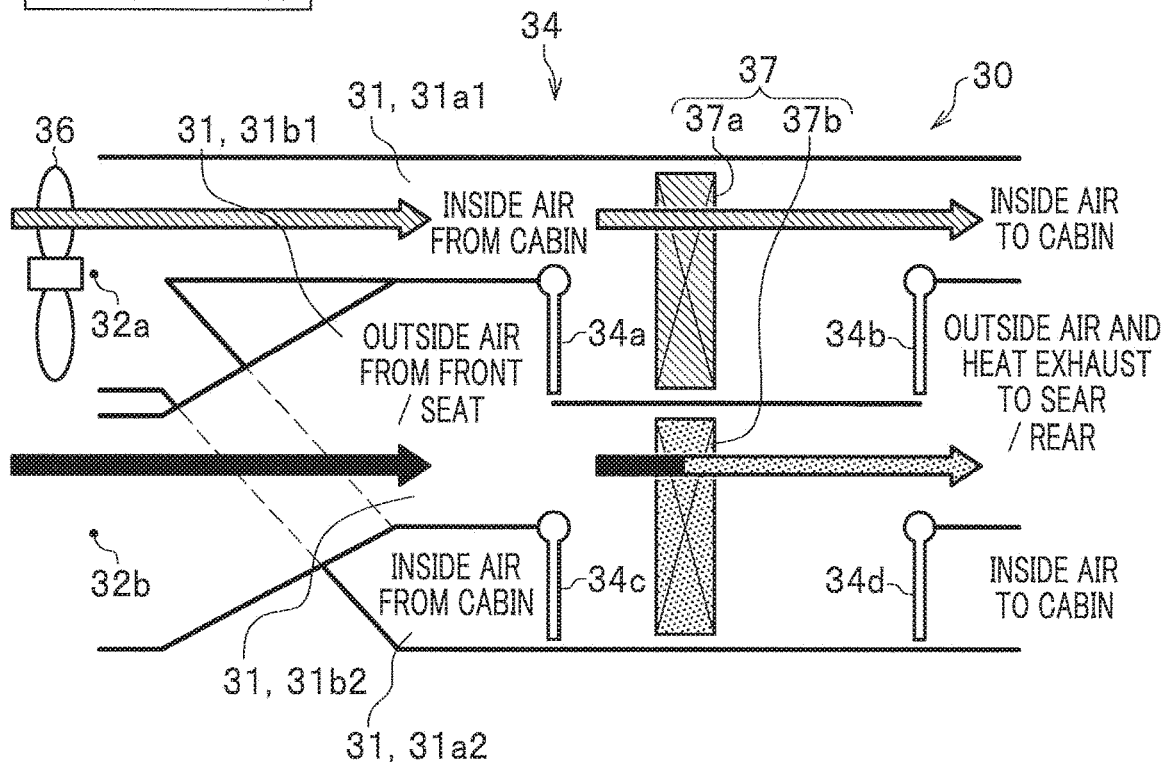
FIG. 9 is a diagram illustrating how the seat air conditioning unit works during heating operation.

With reference to FIG. 9, the following illustrates how each seat air conditioning unit 30 works during heating operation. FIG. 9 is a diagram illustrating how the seat air conditioning unit 30 works during heating operation. Here, assumed and described is a case where the seat air conditioning units 30 are disposed at the front row.

As shown in FIG. 9, in each seat air conditioning unit 30 during heating operation, the switching doors 34a and 34b are operated to open the first inside air passage 31a1 and close the first outside air passage 31b1. In addition, the switching doors 34c and 34d are operated to open the second outside air passage 31b2 and close the second inside air passage 31a2. Further, the condenser 37a and the evaporator 37b are turned ON.

While kept under such conditions, each seat air conditioning unit 30 actuates the fan 36 to cause inside air to flow through the first inside air passage 31a1 to the downstream side and then to pass through the condenser 37a. At that time, heat is exchanged between the inside air and a refrigerant flowing through the condenser 37a. This heats the inside air. After that, the seat air conditioning unit 30 releases the inside air into the cabin. In addition, each seat air conditioning unit 30 causes outside air delivered from the front air conditioning unit 20 to flow through the second outside air passage 31b2 and then to pass through the evaporator 37b. At that time, heat is exchanged between the outside air and a refrigerant flowing through the evaporator 37b. This cools the outside air. After that, the seat air conditioning unit 30 sends the outside air, via the corresponding exhaust duct 62a, to the corresponding seat air conditioning unit 30 at the rear row. Each seat air conditioning unit 30 at the rear row can work like each seat air conditioning unit 30 at the front row. After that, each seat air conditioning unit 30 at the rear row sends the outside air, via the corresponding exhaust duct 62b, to the corresponding rear blowing unit 40.

<How Comparative Embodiment is Configured and Works>

Figure 10:
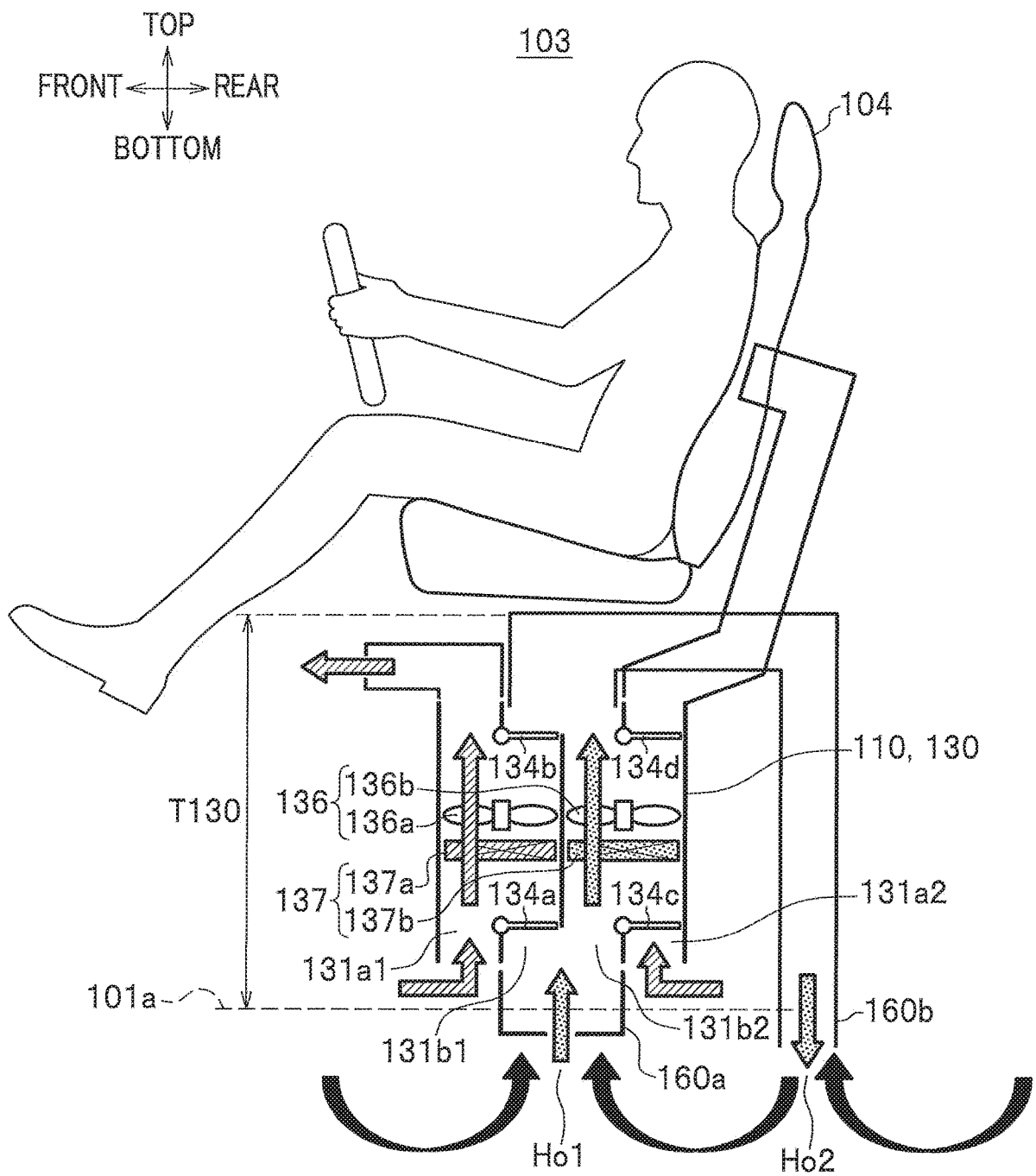
FIG. 10 is a schematic diagram of the structure of a seat air conditioning unit of an air conditioning apparatus according to a comparative embodiment when viewed from a lateral side.
Figure 11:
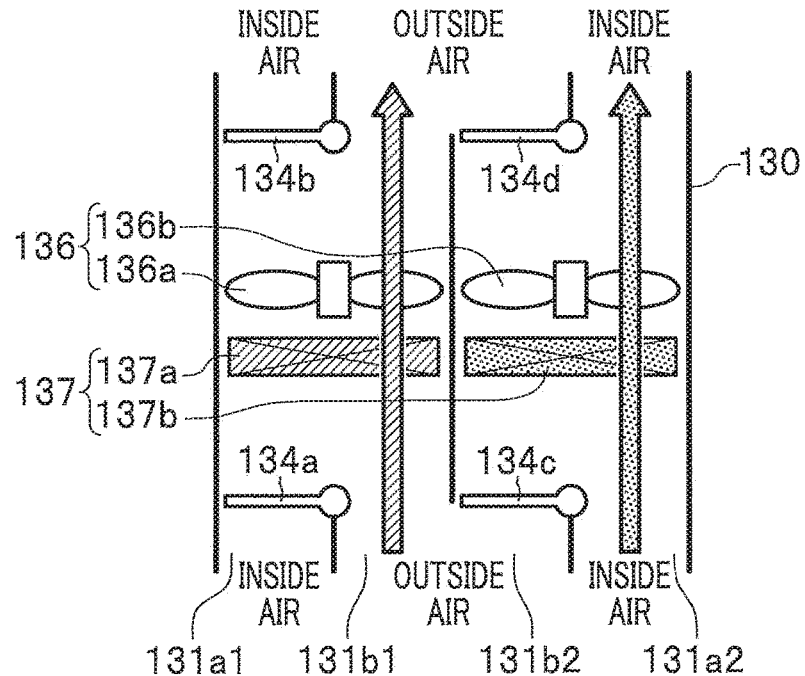
FIG. 11 is a diagram illustrating how the seat air conditioning unit according to the comparative embodiment works during cooling operation.
Figure 12:
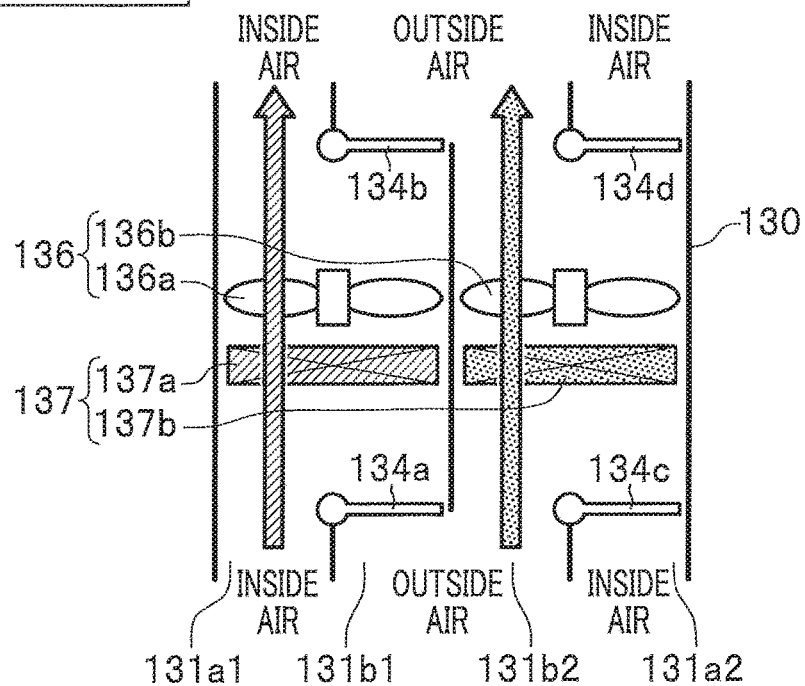
FIG. 12 is a diagram illustrating how the seat air conditioning unit according to the comparative embodiment works during heating operation.

Meanwhile, the idea of the air conditioning apparatus 10 according to the present embodiment can also provide a solution to the problems of an air conditioning apparatus 110 according to the following comparative embodiment. The air conditioning apparatus 110 according to the comparative embodiment is structured while ducts are considered to be simplified. With reference to FIGS. 10 to 12, the following describes the structure and problems of the air conditioning apparatus 110 according to the comparative embodiment. FIG. 10 is a schematic diagram of the structure of a seat air conditioning unit 130 of the air conditioning apparatus 110 according to the comparative embodiment when viewed from a lateral side. FIG. 11 is a diagram illustrating how the seat air conditioning unit 130 according to the comparative embodiment works during cooling operation. FIG. 12 is a diagram illustrating how the seat air conditioning unit 130 according to the comparative embodiment works during heating operation.

When compared to the air conditioning apparatus 10 according to the present embodiment, the air conditioning apparatus 110 according to the comparative embodiment as shown in FIG. 10 has the seat air conditioning unit 130 instead of the seat air conditioning unit 30 (see FIG. 5B). This point is a difference.

The seat air conditioning unit 130 according to the comparative embodiment is arranged below a seat 104. The seat air conditioning unit 130 according to the comparative embodiment includes: two fans 136 (136a, 136b) for causing inside air and outside air to flow; and a heat exchanger 137 for exchanging heat between a refrigerant and the inside air and between a refrigerant and the outside air. In addition, the seat air conditioning unit 130 according to the comparative embodiment has the heat exchanger 137 including a condenser 137a, in which a refrigerant is condensed, and an evaporator 137b, in which a refrigerant is evaporated.

Also, the seat air conditioning unit 130 according to the comparative embodiment is provided with: two inside air-flowing passages (the first inside air passage 131a1 and the second inside air passage 131a2); and two outside air-flowing passages (the first outside air passage 131b1 and the second outside air passage 131b2). The first outside air passage 131b1 and the second outside air passage 131b2 are adjacent to each other in a front-rear direction. The first inside air passage 131a1 is disposed forwardly of and next to the first outside air passage 131b1. The second inside air passage 131*a*2 is disposed rearwardly of and next to the second outside air passage 131*b*2.

The first inside air passage 131*a*1 is shaped like an inverted L letter, extending from the bottom to the top, and having an upper end side protruding forwardly below the seat 104. The first inside air passage 131*a*1 has openings at a lower end portion and a front end portion on the upper end side. The opening of the lower end portion functions as an air inlet and the opening of the front end portion on the upper end side functions as an air outlet. The first inside air passage 131*a*1 is structured such that inside air is taken in from the opening (air inlet) of the lower end portion and the inside air is discharged, to the cabin, from the opening (air outlet) of the front end portion on the upper end side.

The second inside air passage 131*a*2 is shaped like a crank, extending from the bottom to the top, having a partway portion curved reward, and further having an upper end side protruding forward so as to be connected to a seatback portion of the seat 104 The second inside air passage 131*a*2 has openings at a lower end portion and a front end portion on the upper end side. The opening of the lower end portion functions as an air inlet and the opening of the front end portion on the upper end side functions as an air outlet. The second inside air passage 131*a*2 is structured such that inside air is taken in from the opening (air inlet) of the lower end portion and the inside air is discharged via the seat 104, to the cabin, from the opening (air outlet) of the front end portion on the upper end side.

The first outside air passage 131*b*1 and the second outside air passage 131*b*2 are shaped like an inverted U letter, extending from the bottom to the top, having a partway portion curved reward, and having a leading end portion bent downward. The first outside air passage 131*b*1 and the second outside air passage 131*b*2 have openings at two lower end portions. The opening of the lower end portion (hereinafter, referred to as "one lower end portion") sandwiched between the first inside air passage 131*a*1 and the second inside air passage 131*a*2 functions as an air inlet and the opening of the other lower end portion functions as an air outlet. An introduction pipe 160*a* is attached to the opening (air inlet) of the one lower end portion. In addition, a discharge pipe 160*b* is attached to the opening (air outlet) of the other lower end portion. The first outside air passage 131*b*1 and the second outside air passage 131*b*2 are structured such that outside air is introduced thereinto from the opening (air inlet) of the one lower end portion and the outside air is discharged outside the cabin from the opening (air outlet) of the other lower end portion.

The first inside air passage 131*a*1 and the first outside air passage 131*b*1 share a common space in their partway. The common space includes, in sequence from the bottom, the condenser 137*a* and the fan 136*a*. The second inside air passage 31*a*2 and the second outside air passage 31*b*2 share a common space in their partway. The common space includes, in sequence from the bottom, the evaporator 137*b* and the fan 136*b*. In the comparative embodiment, the condenser 137*a* and the evaporator 137*b* are arranged at substantially the same height position. In addition, the fan 136*a* and the fan 136*b* are arranged at substantially the same height position.

Switching doors 134*a* and 134*b* are provided between the first inside air passage 131*a*1 and the first outside air passage 131*b*1. The switching door 134*a* is positioned below the condenser 137*a* and the fan 136*a*. In addition, the switching door 134*b* is positioned above the condenser 137*a* and the fan 136*a*.

Switching doors 134*c* and 134*d* are provided between the second inside air passage 131*a*2 and the second outside air passage 131*b*2. The switching door 134*c* is positioned below the evaporator 137*b* and the fan 136*b*. In addition, the switching door 134*d* is positioned above the evaporator 137*b* and the fan 136*b*.

As shown in FIG. 11, in the seat air conditioning unit 130 according to the comparative embodiment during cooling operation, the switching doors 134*a* and 134*b* are operated to close the first inside air passage 131*a*1 and open the first outside air passage 131*b*1. In addition, the switching doors 134*c* and 134*d* are operated to close the second outside air passage 131*b*2 and open the second inside air passage 131*a*2. Further, the condenser 137*a* and the evaporator 137*b* are turned ON.

Under such conditions, the seat air conditioning unit 130 according to the comparative embodiment actuates the fan 136*a* and the fan 136*b*. By doing so, the seat air conditioning unit 130 according to the comparative embodiment causes inside air to flow through the second inside air passage 131*a*2 to the downstream side (in the upper direction of FIG. 11) and then to pass through the evaporator 137*b*. At that time, heat is exchanged between the inside air and a refrigerant flowing through the evaporator 137*b*. This cools the inside air. After that, the seat air conditioning unit 130 according to the comparative embodiment releases the inside air into the cabin. In addition, the seat air conditioning unit 130 according to the comparative embodiment causes outside air to flow through the first outside air passage 131*b*1 to the downstream side (in the upper direction of FIG. 11) and then to pass through the condenser 137*a*. At that time, heat is exchanged between the outside air and a refrigerant flowing through the condenser 137*a*. This heats the outside air. After that, the seat air conditioning unit 130 according to the comparative embodiment delivers the outside air to the outside of the cabin.

As shown in FIG. 12, in the seat air conditioning unit 130 according to the comparative embodiment during heating operation, the switching doors 134*a* and 134*b* are operated to open the first inside air passage 131*a*1 and close the first outside air passage 131*b*1. In addition, the switching doors 134*c* and 134*d* are operated to open the second outside air passage 131*b*2 and close the second inside air passage 131*a*2. Further, the condenser 137*a* and the evaporator 137*b* are turned ON.

Under such conditions, the seat air conditioning unit 130 according to the comparative embodiment actuates the fan 136*a* and the fan 136*b*. By doing so, the seat air conditioning unit 130 according to the comparative embodiment causes inside air to flow through the first inside air passage 131*a*1 to the downstream side (in the upper direction of FIG. 11) and then to pass through the condenser 137*a*. At that time, heat is exchanged between the inside air and a refrigerant flowing through the condenser 137*a*. This heats the inside air. After that, the seat air conditioning unit 130 according to the comparative embodiment releases the inside air into the cabin. In addition, the seat air conditioning unit 130 according to the comparative embodiment causes outside air to flow through the second outside air passage 131*b*2 to the downstream side (in the upper direction of FIG. 11) and then to pass through the evaporator 137*b*. At that time, heat is exchanged between the outside air and a refrigerant flowing through the evaporator 137*b*. This cools the outside air. After that, the seat air conditioning unit 130 according to the comparative embodiment delivers the outside air to the outside of the cabin.

The air conditioning apparatus 110 according to the comparative embodiment as so structured has the following problems.

(1) As shown in FIG. 10, the air conditioning apparatus 110 according to the comparative embodiment has a low degree of design freedom because air flow in or out of the seat air conditioning unit 130 is complicated.

(2) As shown in FIG. 10, the air conditioning apparatus 110 according to the comparative embodiment is difficult to secure space for the fans 136 and the switching doors 134a, 134b, 134c, and 134d because the seat air conditioning unit 130 is configured extending in a vertical direction. Such an air conditioning apparatus 110 according to the comparative embodiment has a low degree of design freedom because the height T130 from a vehicle body floor 101a is a relatively large value and is required.

(3) As shown in FIG. 10, the air conditioning apparatus 110 according to the comparative embodiment needs, as the fans 136 for the heat exchanger, two fans 136a and 136b per seat air conditioning unit 130. Such an air conditioning apparatus 110 according to the comparative embodiment needs a large number of parts, so that the size and cost of the seat air conditioning unit 130 increase.

(4) As shown in FIG. 10, the air conditioning apparatus 110 according to the comparative embodiment needs a plurality of vent holes Ho1 and Ho2 on the vehicle body side (e.g., the vehicle body floor 101a) so as to secure air passages to the heat exchanger 137. The vent hole Ho1 is an inlet vent hole and the vent hole Ho2 is an outlet vent hole. The air conditioning apparatus 110 according to the comparative embodiment needs to provide two (inlet/outlet) vent holes (Ho1/Ho2) per seat air conditioning unit 130. Due to this, if the number of the seat air conditioning units 130 is 4, for instance, the air conditioning apparatus 110 according to the comparative embodiment needs to provide 8 vent holes (Ho1 and Ho2). Because such an air conditioning apparatus 110 according to the comparative embodiment is provided with a plurality of the vent holes Ho1 and Ho2 on the vehicle body side, rainwater and/or running noise may enter the cabin.

(5) Regarding the air conditioning apparatus 110 according to the comparative embodiment, when the outside air temperature is low, the heat exchanger 137 may not effectively function because the evaporator 137b of the seat air conditioning unit 130 is frosted.

In contrast to the air conditioning apparatus 110 according to the comparative embodiment, the air conditioning apparatus 10 according to the present embodiment has the following advantages.

(1) As shown in FIG. 5B, the air conditioning apparatus 10 according to the present embodiment has an increased degree of design freedom because air flow in or out of the seat air conditioning unit 30 is simplified.

(2) As shown in FIG. 5B, the air conditioning apparatus 10 according to the present embodiment is easy to secure space for the fan 36 and the switching doors 34a, 34b, 34c, and 34d because the seat air conditioning unit 30 is configured extending in a front-rear direction. Such an air conditioning apparatus 10 according to the present embodiment differs from the air conditioning apparatus 110 according to the comparative embodiment. The height from the vehicle body floor 101a can be lowered, so that the degree of design freedom can be enhanced.

(3) As shown in FIG. 5B, the air conditioning apparatus 10 according to the present embodiment is provided, per seat air conditioning unit 30, with just one fan 36 for the inside air heat exchanger, so that a fan (blowing fan) for the outside air heat exchanger can be omitted. In such an air conditioning apparatus 10 according to the present embodiment, the number of parts can be reduced by the number of the fans (blowing fans) for the outside air heat exchanger, so that the size and cost of the seat air conditioning unit 30 can be improved.

(4) As shown in FIG. 5B, the air conditioning apparatus 10 according to the present embodiment differs from the air conditioning apparatus 110 according to the comparative embodiment and does not have to be provided with a plurality of vent holes on the vehicle body side (e.g., the vehicle body floor) so as to secure air passages to the heat exchanger 37. Such an air conditioning apparatus 10 according to the present embodiment differs from the air conditioning apparatus 110 according to the comparative embodiment, such that rainwater and/or running noise can be prevented from entering the cabin.

(5) Regarding the air conditioning apparatus 10 according to the present embodiment, like the air conditioning apparatus 110 according to the comparative embodiment, when the outside air temperature is low, the evaporator 37b of each seat air conditioning unit 30 may be frosted. However, as shown in FIG. 7C, the air conditioning apparatus 10 according to the present embodiment operates, when the outside air temperature is low, the front air conditioning unit 20 to open the first inside air passage 21a1 and the second inside air passage 21a2 of the front air conditioning unit 20 such that the inside air is made to pass through the heater 27. This makes it possible to increase the volume of heated inside air supplied to the cabin by the air conditioning apparatus 10 according to the present embodiment. In such an air conditioning apparatus 10 according to the present embodiment, when the outside air temperature is low, the heater 27 of the front air conditioning unit 20 can help defrost the evaporator 37b of the seat air conditioning unit 30. Because of this, the air conditioning apparatus 10 according to the present embodiment differs from the air conditioning apparatus 110 according to the comparative embodiment and can prevent the heat exchanger 37, even when the outside air temperature is low, from malfunctioning due to the frosted evaporator 37b of the seat air conditioning unit 30.

<Main Features of Air Conditioning Apparatus According to Present Embodiment>

(1) As shown in FIG. 2, the air conditioning apparatus 10 (vehicle air conditioning apparatus) according to the present embodiment includes a plurality of seat air conditioning units 30 for cooling or heating which is selectively performed per corresponding seat 104 among a plurality of seats 104 installed in the cabin 103. In addition, the air conditioning apparatus 10 is provided with a plurality of exhaust ducts 62aR, 62aL, 62bR, and 62bL for discharging, outside the cabin 103, part of air used in the seat air conditioning units 30. The exhaust duct 62a or 62b of a given one (at least one) of the plurality of seat air conditioning units 30 is optionally connected to the air inlet of another seat air conditioning unit 30. For instance, in the present embodiment, the exhaust ducts 62aR and 62aL of the seat air conditioning units 30 on the front row are connected to the air inlets of the seat air conditioning units 30 at the rear row.

In such an air conditioning apparatus 10 according to the present embodiment, the ducts 60 (in particular, exhaust ducts 62a and 62b) can be simplified. In addition, the air conditioning apparatus 10 can gather and discharge, through exhaust ducts 62a and 62b, part of air (outside air), together with heat, used in the seat air conditioning units 30 (that is, heat of each seat air conditioning unit 30 can be drained together). Also, in the air conditioning apparatus 10, the size of each seat air conditioning unit 30 can be made compact. Thus, in the air conditioning apparatus 10, the degree of design freedom can be enhanced.

Note that the air conditioning apparatus may not be structured such that the exhaust duct 62a or 62b of a given seat air conditioning unit 30 is optionally connected to the air inlet of another seat air conditioning unit 30. For instance, the following structure is possible. That is, the air conditioning apparatus may be structured such that the exhaust duct 62aR and the exhaust duct 62bR on the right side are connected and the exhaust duct 62aL and the exhaust duct 62bL on the left side are connected. Unfortunately, in such a structure, the structure of the exhaust ducts 62a and 62b is more complicated than that of the air conditioning apparatus 10 according to the present embodiment. Because of this, the ducts 60 (in particular, the exhaust ducts 62a and 62b) of the air conditioning apparatus 10 according to the present embodiment can be more efficiently simplified than those of such a structure.

(2) As shown in FIG. 2, the air conditioning apparatus 10 (vehicle air conditioning apparatus) according to the present embodiment is provided with a plurality of air supply ducts 61R and 61L for supplying outside air to the seat air conditioning units 30. The air supply ducts 61R and 61L should be merged.

In such an air conditioning apparatus 10 according to the present embodiment, the ducts 60 (in particular, air supply ducts 61) can be simplified. In addition, the air conditioning apparatus 10 can use the air supply ducts 61 to supply outside air for heat exhaust to each seat air conditioning unit 30 at the front row. Further, the outside air for heat exhaust can also be supplied to each seat air conditioning unit 30 on the downstream side at the rear row. That is, the air supply to each seat air conditioning unit 30 at the front row and the air supply to each seat air conditioning unit 30 at the rear row can be carried out together. In such an air conditioning apparatus 10, the front air conditioning unit 20, the seat air conditioning units 30, and the rear blowing units 40 can share a fan for outside air heat exchanger. As a result, in the air conditioning apparatus 10, the fan (blowing fan) for the outside air heat exchanger of each seat air conditioning unit 30 can be omitted (see FIG. 5B). For instance, when the air conditioning apparatus 10 has four seat air conditioning units 30, four fans (blowing fans) for outside air heat exchanger can be omitted. Due to this, in the air conditioning apparatus 10, the size and cost of each seat air conditioning unit 30 can be improved. Also, in the air conditioning apparatus 10, vent holes between each heat exchanger and the outside of the cabin may be unified, so that the number of vehicle vent holes can be reduced. Thus, in the air conditioning apparatus 10, a risk of water infiltration and/or noise can be decreased. Further, in the air conditioning apparatus 10, the surrounding members can be simplified.

(3) As shown in FIG. 5B, in the air conditioning apparatus 10 (vehicle air conditioning apparatus) according to the present embodiment, it is preferable that each seat air conditioning unit 30 has the following configuration. Specifically, the air conditioning apparatus 10 has the condenser 37a for condensing a refrigerant and the evaporator 37b for evaporating a refrigerant. In addition, the air conditioning apparatus 10 has passages for flowing outside air and inside air (the first inside air passage 31a1, the second inside air passage 31a2, the first outside air passage 31b1, and the second outside air passage 31b2). Further, the air conditioning apparatus 10 has passage switching means (switching doors 34a, 34b, 34c, and 34d) for switching between passages such that during cooling operation, outside air is guided in a direction toward the condenser 37a and during heating operation, outside air is guided in a direction toward the evaporator 37b.

In such an air conditioning apparatus 10 according to the present embodiment, even when the outside air temperature is low and the capacity of each seat air conditioning unit 30 may be insufficient, the evaporator 37b of each seat air conditioning unit 30 is defrosted, so that heat absorption efficiency of the heat exchanger 37 of each seat air conditioning unit 30 can be increased.

(4) As shown in FIG. 5B, in the air conditioning apparatus 10 (vehicle air conditioning apparatus) according to the present embodiment, it is preferable that each seat air conditioning unit 30 has the following configuration. Specifically, the air conditioning apparatus 10 has the first outside air passage 31b1 through which outside air flows into the condenser 37a and the second outside air passage 31b2 through which outside air flows into the evaporator 37b. In addition, the air conditioning apparatus 10 has the first inside air passage 31a1 through which inside air flows into the condenser 37a and the second inside air passage 31a2 through which inside air flows into the evaporator 37b. Here, in the air conditioning apparatus 10, the air inlet of the first outside air passage 31b1 and the air inlet of the second outside air passage 31b2 are merged. In addition, in the air conditioning apparatus 10, the air outlet of the first outside air passage 31b1 and the air outlet of the second outside air passage 31b2 are merged. Further, in the air conditioning apparatus 10, the air inlet of the first inside air passage 31a1 and the air inlet of the second inside air passage 31a2 are merged.

In such an air conditioning apparatus 10 according to the present embodiment, the outside air-use air inlets are merged, outside air-use air outlets are merged, and inside air-use air inlets are merged, so that the size of each seat air conditioning unit 30 can be made compact. Thus, in the air conditioning apparatus 10, the degree of design freedom can be enhanced.

(5) As shown in FIGS. 8 and 9, it is preferable that the air conditioning apparatus 10 (vehicle air conditioning apparatus) according to the present embodiment has the following configuration. Specifically, in the air conditioning apparatus 10, the first outside air passage 31b1 and the first inside air passage 31a1 share a common space around the condenser 37a. In addition, in the air conditioning apparatus 10, the second outside air passage 31b2 and the second inside air passage 31a2 share a common space around the evaporator 37b. As shown in FIG. 8, the passage switching means (switching doors 34a, 34b, 34c, and 34d) can be used to switch between passages such that during cooling operation, outside air passes through the first outside air passage 31b1 and inside air passes through the second inside air passage 31a2. As shown in FIG. 9, the passage switching means (switching doors 34a, 34b, 34c, and 34d) can be used to switch between passages such that during heating operation, outside air passes through the second outside air passage 31b2 and inside air passes through the first inside air passage 31a1.

Such a seat air conditioning unit 30 of the air conditioning apparatus 10 according to the present embodiment has a simple structure and can then implement outside air heat exchange and inside air heat exchange. Thus, in the air conditioning apparatus 10, the degree of design freedom can be enhanced.

As described above, the air conditioning apparatus 10 according to the present embodiment makes it possible to simplify the ducts 60 (see FIG. 2) and reduce the number of blowing fans (see FIG. 5B).

The present invention is not limited to the above embodiment(s) and can be variously modified and/or altered without departing from the spirit of the present invention.

For instance, the number of the seat air conditioning units 30 is not limited to four and may be two or more.

In addition, for instance, in the above embodiment(s), exemplified is the case where the seats 104 are provided at two rows: the front row and the rear low. However, the number of rows for the seats 104 may be three or more. In this case, the seat air conditioning units 30 installed at the respective seats 104 at or after the third row each use substantially the same exhaust ducts as of the seat air conditioning units 30 at the first or second row so as to be connected to another seat air conditioning unit 30 or the corresponding rear blowing unit 40.

REFERENCE SIGNS LIST

10 Air conditioning apparatus (vehicle air conditioning apparatus)
20 Front air conditioning unit
21 Inside/outside air switching damper
21a1 First inside air passage
21a2 Second inside air passage
21b Outside air passage
24a, 24b, 24c (24) Switching door (switching device)
25 Filter
26 (26a, 26b) Fan
27 Heater
27a Heater core
27b Heat pipe
30 (30FR, 30FL, 30RR, 30RL) Seat air conditioning unit
31 Inside/outside air switching damper
31a1 First inside air passage (flow path)
31a2 Second inside air passage (flow path)
31b1 First outside air passage (flow path)
31b2 Second outside air passage (flow path)
32a, 32b Air inlet
34a, 34b, 34c, 34d (34) Switching door (passage switching device)
36 Fan
37 Heat exchanger
37a Condenser
37b Evaporator
40 (40R, 40L) Rear blowing unit
41b Outside air passage
45 Fan
50a Introduction port
50b Vent hole
60 Duct
61 (61R, 61L) Air supply duct
62a (62aR, 62aL), 62b (62bR, 62bL) Exhaust duct
63 (63R, 63L) Ventilation duct
71 Condenser air passage
71a Inside air inlet of the condenser air passage 71
71b Inside air outlet of the condenser air passage 71
71c Outside air inlet of the condenser air passage 71
71d Outside air outlet of the condenser air passage 71
72 Evaporator air passage
72a Outside air inlet of the evaporator air passage 72
72b Outside air outlet of the evaporator air passage 72
72c Inside air inlet of the evaporator air passage 72
72d Inside air outlet of the evaporator air passage 72
100 Vehicle
102 Front section
103 Cabin
104 Seat

The invention claimed is:

1. A vehicle air conditioning apparatus comprising:
a plurality of seat air conditioning units configured to selectively perform cooling or heating per corresponding seat among a plurality of seats installed in a cabin, respectively; and
a plurality of exhaust ducts for discharging, outside the cabin, part of air used in the plurality of seat air conditioning units,
wherein
an exhaust duct of a given one of the plurality of seat air conditioning units is connected to an air inlet of another seat air conditioning unit,
each seat air conditioning unit comprises:
a condenser passage housing a condenser for condensing a refrigerant;
an evaporator passage housing an evaporator for evaporating the condensed refrigerant;
an outside air passage inducing outside air and including a first outside air passage connected to an outside air inlet of the condenser passage and a second outside air passage connected to an outside air inlet of the evaporator passage, and an inside air passage inducing inside air, the inside air passage including a first inside air passage connected to an inside air inlet of the condenser passage and a second inside air passage connected to an inside air inlet of the evaporator passage;
a passage switching device including a first door opening any one of the outside air inlet of the condenser passage or the inside air inlet of the condenser passage and closing the other of the outside air inlet of the condenser passage or the inside air inlet of the condenser passage, and a second door opening any one of the outside air inlet of the evaporator passage or the inside air inlet of the evaporator passage and closing the other of the outside air inlet of the evaporator passage or the inside air inlet of the evaporator passage, wherein the passage switching device performs switching with the first door and the second door such that during cooling operation, the outside air is guided in a direction toward the condenser and during heating operation, the outside air is guided to a direction toward the evaporator;
an air inlet of the first outside air passage and an air inlet of the second outside air passage are merged,
an air outlet of the first outside air passage and an air outlet of the second outside air passage are merged, and
an air inlet of the first inside air passage and an air inlet of the second inside air passage are merged.

* * * * *